US009552143B2

(12) United States Patent
Javey et al.

(10) Patent No.: US 9,552,143 B2
(45) Date of Patent: *Jan. 24, 2017

(54) SYSTEMS AND METHODS OF INTERACTION WITH WATER USAGE INFORMATION

(71) Applicant: Badger Meter, Inc., Milwaukee, WI (US)

(72) Inventors: Shahram Javey, Los Gatos, CA (US); Patrick Rodriguez, Laguna Hills, CA (US); Donald Walker, Los Gatos, CA (US)

(73) Assignee: Badger Meter, Inc., Milwaukee, WI (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/144,859

(22) Filed: Dec. 31, 2013

(65) Prior Publication Data

US 2014/0245208 A1    Aug. 28, 2014

Related U.S. Application Data

(63) Continuation of application No. 12/713,137, filed on Feb. 25, 2010, now Pat. No. 8,618,941.

(60) Provisional application No. 61/155,386, filed on Feb. 25, 2009, provisional application No. 61/186,783, filed on Jun. 12, 2009.

(51) Int. Cl.
    G08B 1/00      (2006.01)
    G06F 3/0484    (2013.01)
    H04Q 9/00      (2006.01)

(52) U.S. Cl.
    CPC ............. *G06F 3/0484* (2013.01); *H04Q 9/00* (2013.01); *H04Q 2209/30* (2013.01); *H04Q 2209/43* (2013.01); *H04Q 2209/60* (2013.01); *H04Q 2209/823* (2013.01)

(58) Field of Classification Search
    None
    See application file for complete search history.

(56) References Cited

U.S. PATENT DOCUMENTS

| 6,556,142 | B2 * | 4/2003 | Dunstan | 340/606 |
|---|---|---|---|---|
| 6,944,523 | B2 * | 9/2005 | Addink et al. | 700/284 |
| 7,248,179 | B2 * | 7/2007 | Smit | 340/870.02 |
| 2002/0046197 | A1 * | 4/2002 | Kashti | G06Q 30/0283 705/412 |
| 2002/0198629 | A1 * | 12/2002 | Ellis | G06Q 50/06 700/286 |
| 2003/0216971 | A1 * | 11/2003 | Sick | G01D 4/004 705/7.36 |
| 2007/0258574 | A1 * | 11/2007 | Paraskevakos et al. | 379/221.11 |
| 2008/0117077 | A1 * | 5/2008 | Ratiu et al. | 340/870.02 |

(Continued)

*Primary Examiner* — Julie Lieu
(74) *Attorney, Agent, or Firm* — Boyle Fredrickson, S.C.

(57) ABSTRACT

Exemplary systems and methods for interaction with water usage information are provided. In various embodiments, a method comprises receiving water usage data from a meter device, receiving an identifier from a user associated with the meter device, providing an interactive interface to the user, the interactive interface conveying at least some water usage information based on the water usage data, receiving a first characterization of a first water activity from the user, generating a visualization based on the water usage information and the first characterization of the first water activity, and displaying the visualization.

21 Claims, 16 Drawing Sheets

(56) References Cited

U.S. PATENT DOCUMENTS

| | | | |
|---|---|---|---|
| 2008/0224892 A1* | 9/2008 | Bogolea et al. | 340/870.3 |
| 2009/0094097 A1* | 4/2009 | Gardenswartz | G05B 15/02 705/7.22 |
| 2009/0210295 A1* | 8/2009 | Edholm | G06Q 10/06393 705/7.39 |
| 2010/0060479 A1* | 3/2010 | Salter | 340/870.4 |
| 2010/0156665 A1* | 6/2010 | Krzyzanowski et al. | 340/870.02 |
| 2011/0066442 A1* | 3/2011 | Ayachitula et al. | 705/1.1 |
| 2011/0251807 A1* | 10/2011 | Rada | G01D 4/00 702/61 |
| 2012/0271465 A1* | 10/2012 | Zobrist | G05D 23/19 700/282 |

* cited by examiner

FIG. 12

SYSTEMS AND METHODS OF INTERACTION WITH WATER USAGE INFORMATION

CROSS REFERENCE TO RELATED APPLICATIONS

This application is a continuation of U.S. non-provisional application Ser. No. 12/713,137, filed Feb. 25, 2010, and seeks priority of U.S. provisional application Ser. No. 61/155,386, filed Feb. 25, 2009 and U.S. provisional application Ser. No. 61/186,783, filed Jun. 12, 2009, all of which are hereby incorporated by reference herein.

BACKGROUND

1. Field of the Invention

Embodiments of the present invention are directed to water usage data and more particularly to interacting with water usage based on water usage data collection.

2. Related Art

There has been an increased interest in environmental and water conservation. Consumers are businesses alike are finding new ways to advertise that they are "Green." Further, saving energy and natural resources can be profitable. By controlling consumption, people and businesses alike control costs.

Unfortunately, determining consumption of energy and natural resources is difficult. Although a consumer or business may receive a general bill for services once a month tram a utility, the bill does not typically indicate how or when the energy or natural resource was consumed. Further, consumers and businesses are typically unaware of the extent that specific activities consume energy and natural resource consumption.

Although electrical smart meters for detecting energy consumption are becoming more common, there appears to be little help for the consumer to identify their water consumption and the costs associated with various water activities (e.g., showers, baths, toilet flushing, cooking, dishwashing, clothes washing, car washing, and irrigation). Even if the consumer of business were to examine the water bill, water bills typically no not identify activities that use water, the amount of water consumption over a given time, or when water was used. As such, businesses and consumers may not put much effort to control and conserve water or other natural resources because of the difficult of identifying the quantity of water being consumed and the activities that may be taken to reduce water consumption.

SUMMARY OF THE INVENTION

Exemplary systems and methods for interaction with water usage information are provided. In various embodiments, a method comprises receiving water usage data from a meter device, receiving an identifier from a user associated with the meter device, providing an interactive interface to the user, the interactive interface conveying at least some water usage information based on the water usage data, receiving a first characterization of a first water activity from the user, generating a visualization based on the water usage information and the first characterization of the first water activity, and displaying the visualization.

In some embodiments, the method further comprises characterizing a second water activity based on pattern matching. The pattern matching may comprise matching a duration of water consumption and a quantity of water consumed with a second characterization. The visualization may be further based also on the second characterization.

The meter device may be a water meter. In other embodiments, the meter device may be coupled to a water meter.

The method may further comprise receiving user preferences to set an alert threshold. The method may also further comprise alerting the user when the alert threshold is exceeded.

In some embodiments, the method may further comprise detecting one or more leaks and notifying the user of the one or more leaks. The method may further comprise displaying suggestions to conserve water based on the water usage information.

An exemplary system may comprise a meter data module, a GUI module, a preference module, and a visualization module. The meter data module may be configured to receive water usage data from a meter device. The GUI module may be configured to receive an identifier from a user associated with the meter device and provide an interactive interface to the user, the interactive interface conveying at least some water usage information based on the water usage data. The preference module may be configured to receive a first characterization of a first water activity from the user. The visualization module may be configured to generate a visualization based on the water usage information and the first characterization of the first water activity and display the visualization.

An exemplary computer readable medium may comprise instructions. The instructions may be executable by a processor to perform a method. The method may comprise receiving water usage data from a meter device, receiving an identifier from a user associated with the meter device, providing an interactive interface to the user, the interactive interface conveying at least some water usage information based on the water usage data, receiving a first characterization of a first water activity from the user, generating a visualization based on the water usage information and the first characterization of the first water activity, and displaying the visualization.

BRIEF DESCRIPTION OF THE DRAWINGS

FIG. 12 is an exemplary screenshot of a graphical user interface allowing a customer to interact with water usage data in some embodiments.

DETAILED DESCRIPTION OF THE INVENTION

In various embodiments described herein, a water monitoring, water conservation and water usage information sharing service provides utilities and/or their customers access to water usage from any computer or mobile device with Internet access. The customers may access water usage information with a browser. An interactive web based system may provide customers understanding of their water usage. In some embodiments, services are provided to make conservation enjoyable by using customizable and understandable charts as well as community comparisons. Various services may encourage sharing and comparing usage data with friends and neighbors which may reinforce conservation practices and maximize the impact of conservation efforts.

Consumers may interact with the water usage information for education, identify periods of water consumption, identity excess consumption, characterize different times/events associated with water consumption, and identify leaks. In some embodiments, there may be automatic identification of water activities (e.g., taking a shower or watering the lawn) based on statistical, time of use analysis, and a profile of the residential or commercial users of water.

A learning engine may identify usage patterns and activities. Based on the identification from the learning engine, a cost-saving suggestion engine may offer concrete options for users to reduce their water use and to save money. Consumers may provide feedback on a computer or mobile device such as a smart phone.

Water usage information may change usage behavior and lead to substantial reduction in commercial and residential water usage. In addition, access to water usage information can lead to friendly and playful competition between neighborhood, utilities, and consumers to reduce water usage and cam bragging rights. To encourage competition, a water fund may be established where, based on a percentage of water saved by utilities, money is donated. In one example, after reducing water usage, consumers may continue to be rewarded for maintaining the lower level of consumption and the water fund will continue to increase.

Figure 1:
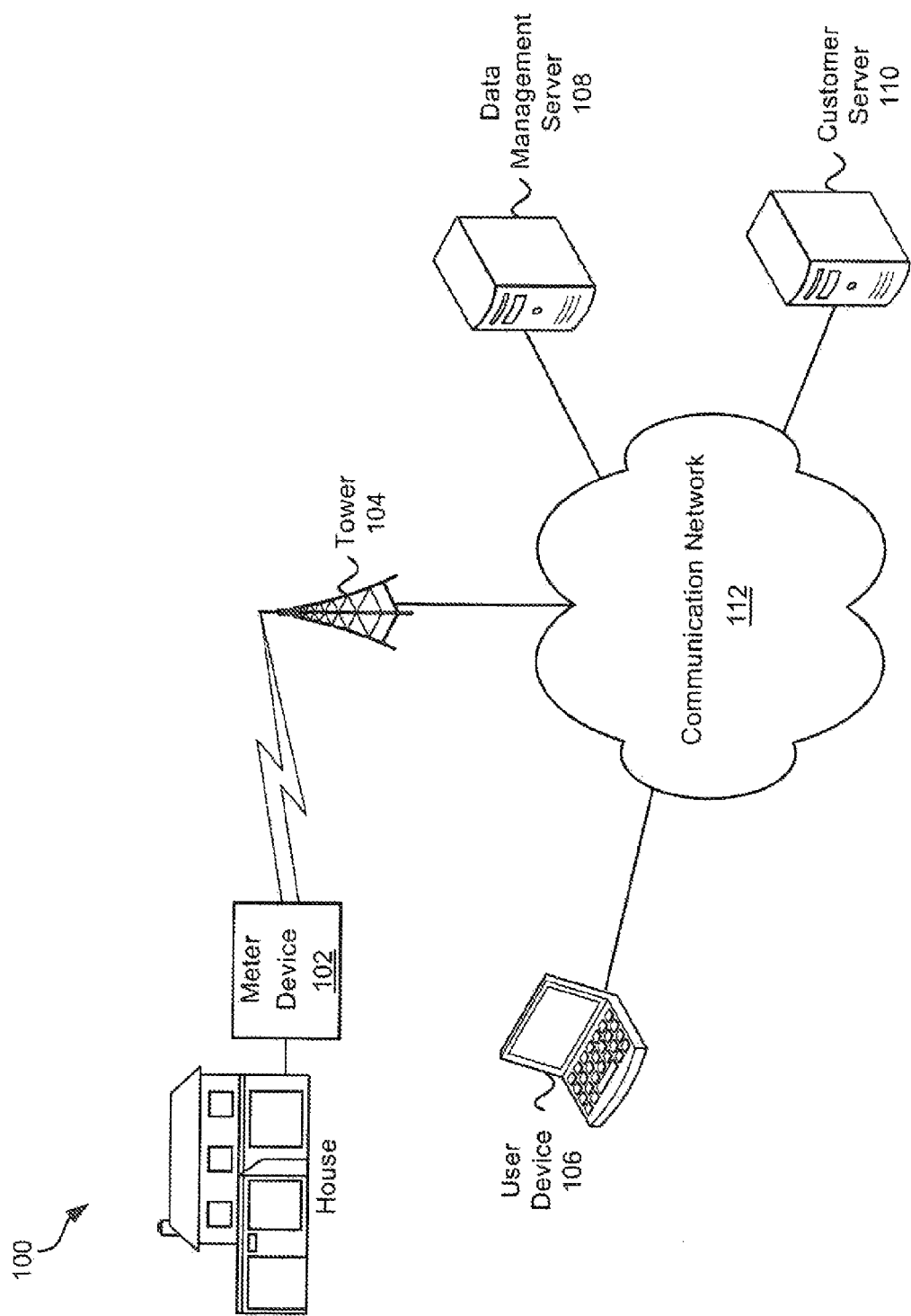
FIG. 1 is an exemplary environment in which embodiments may be practiced.

FIG. 1 is an exemplary environment 100 in which embodiments may be practiced. In some embodiments, a non-intrusive system to monitor water usage and wirelessly transmit water usage data is described. In some embodiments, water usage data is any data that indicates a quantity of water that flows through at least one pipe. Water usage data may be any data related to water usage and/or consumption by a business, residence, garden, field, farm, orchard, reservoir or the like. In one example, water usage data is data associated with water received from a utility (e.g., the total water received by a residence including water used in showers, cooking, irrigation, toilet use, and drinking, as well as water wasted such as leaks).

In various embodiments, water usage data from a residence, such as the home depicted in FIG. 1, or a business may be provided to a server (e.g., customer server 110). A customer may then interact with the water usage information (e.g., through a web page) to characterize periods of water usage (e.g., identification of periods of water use as "shower," "irrigation," or "morning ritual"), detect leaks, and/or change behaviors in order to conserve water. Water usage information is information that is displayed or presented to a user via a web site. The water usage information may be based on water usage data from a meter device 102.

The exemplary environment 100 may comprise the meter device 102, a tower 104, a user device 106, a data management server 108, and a customer server 110 in communication with a communication network 112. The meter device 102 may be a water meter or a device coupled to a water meter. The meter device 102 measures water usage and provides water usage data to the data management server 108 and/or the customer server 110.

In some embodiments, the meter device 102 is a water "smart meter" configured to automatically provide (either by wire or wirelessly) water usage data to a utility without a human meter reader.

In some embodiments, the meter device 102 comprises an antenna for wirelessly transmitting the water usage data over the communication network 112 via the tower 104. In one example, the meter device 102 comprises a modem or cellular device configured to wirelessly transmit data (e.g., a GSM or CDMA). The meter device 102 may wirelessly provide the water usage data in any number of ways. In one example, the meter device 102 may provide the water usage data to an access point, router, or satellite dish which may provide the water usage data to a server over a network. In other embodiments, the meter device 102 provides the water usage data over a wired connection such as a telephone wire, Ethernet, or cable, for example.

In some embodiments, the meter device 102 may be configured to receive information. In one example, the meter device 102 receives information wirelessly via the tower 104. The meter device 102, in some embodiments, may be remote controlled. For example, the meter device 102 may receive a command to shut water off, to shut water off after a certain level of consumption is reached, or reduce water flow. In another example, the meter device 102 may be remotely calibrated or prompted to provide updated water usage data. Those skilled in the art will appreciate that any information may be sent to and/or from the meter device 102.

The tower 104 may be any device configured to receive wireless data and provide the data to the communication network 112. The tower 104 may, in some embodiments, be configured to provide data to the meter device 102. The tower 104 may be a cellular telephone tower, satellite, or any antenna. In some embodiments, the tower 104 is configured to receive and transmit signals via GSM, CDMA, WiMAX, LTE, or over any wireless standard or protocol.

The user device 104 may be any digital device. A digital device is any device with a processor and memory. In various examples, the user device 104 may be a computer, laptop, smart phone, media tablet, smart phone, netbook, ereader, television, or the like. In some embodiments, a user may operate the user device 106 to browse the communication network 112 (such as the Internet) to access a web page containing water usage information based on water usage data provided from the meter device 102. The user may interact with the water usage information to monitor consumption, characterize periods of usage, set alerts for consumption, compete with neighbors, and/or conserve water. The user and/or utility may, in some embodiments, control and/or configure the meter device 102 remotely via the web page.

The data management server 108 is a digital device that is configured to receive water usage information and bill the user for water consumption. In various embodiments, the data management server 108 is operated by a utility which monitors or tracks consumption during predetermined periods and bills the user for consumption of the resource.

In some embodiments, the data management server 108 does not receive the water usage data from the meter device 102. For example, a utility may send an employee, such as a meter reader, to the home to read the water meter. The data management server 108 may track consumption, identify potential leaks, and control residential and business access to water.

The customer server 110 is a digital device that is configured to receive water usage data and allow a user (e.g., via the user device 106) to interact with the water usage information. In some embodiments, the customer server 110 is a web server. The user may set up an account and access water usage information for their home or business after registration. The customer server 110 may provide water consumption information visually over predetermined periods of time (e.g., the customer server 110 may generate charts or graphs). The user may also generate reports regarding water consumption over a time period (e.g., last day, last week, last month, or a period of time extending from one date to another). The customer server 110 may also allow the customer to compare data usage at different times, days, or periods of time.

In some embodiments, customer server 110 allows the user to characterize water usage. For example, a user may access a web page displaying water usage information at the user's home over a 24 hour period. The user may categorize certain events of water usage (e.g., water usage from 7:15 AM to 7:30 AM is characterized as "shower"). The user may characterize any period of time of water usage (e.g., irrigation, cooking, toilet flushing or the like).

The customer server 110 may also be configured to provide suggestions for water consumption, track conservation, and provide bonuses or prizes for reduction of water consumption over time. In one example, the customer server 110 may provide a coupon or discount to reduce a water bill if water consumption has been reduced by 15% over three months. Those skilled in the art will appreciate that the customer server 110 may provide any kind of reward system to help customer's control water consumption.

The communication network 112 may be any network that allows digital devices to communicate. The communication network 112 may be the Internet and/or include LAN and WANs. The communication network 112 may support wireless and/or wired communication.

Further, those skilled in the art will appreciate that although only one meter device 102, tower 104, user device 106, data management server 108, customer server 110, and communication network 112 is depicted in FIG. 1, there may be any number of meter devices, towers, user devices, data management servers, customer servers, and communication networks.

In some embodiments, the design of the system is based on the reliable hub-and-spoke architecture. In one example, a user can take advantage of the benefits of the system with just one enabled water meter or many. The system may be very scalable with any number of customers, water meters, and meter devices 102. In some embodiments, there is not need to set up a and maintain a propriety private network.

Although the meter device 102 is described in some embodiments as automatically proving water usage data, the meter device 102 may be any water meter that requires a human meter reader to read the meter and provide the water usage data to the utility and/or customer server 110 manually. The customer may still interact with the water usage information via the customer server 110 regardless how the customer server 110 and/or the data management server 108 receive the water usage data.

Figure 2:
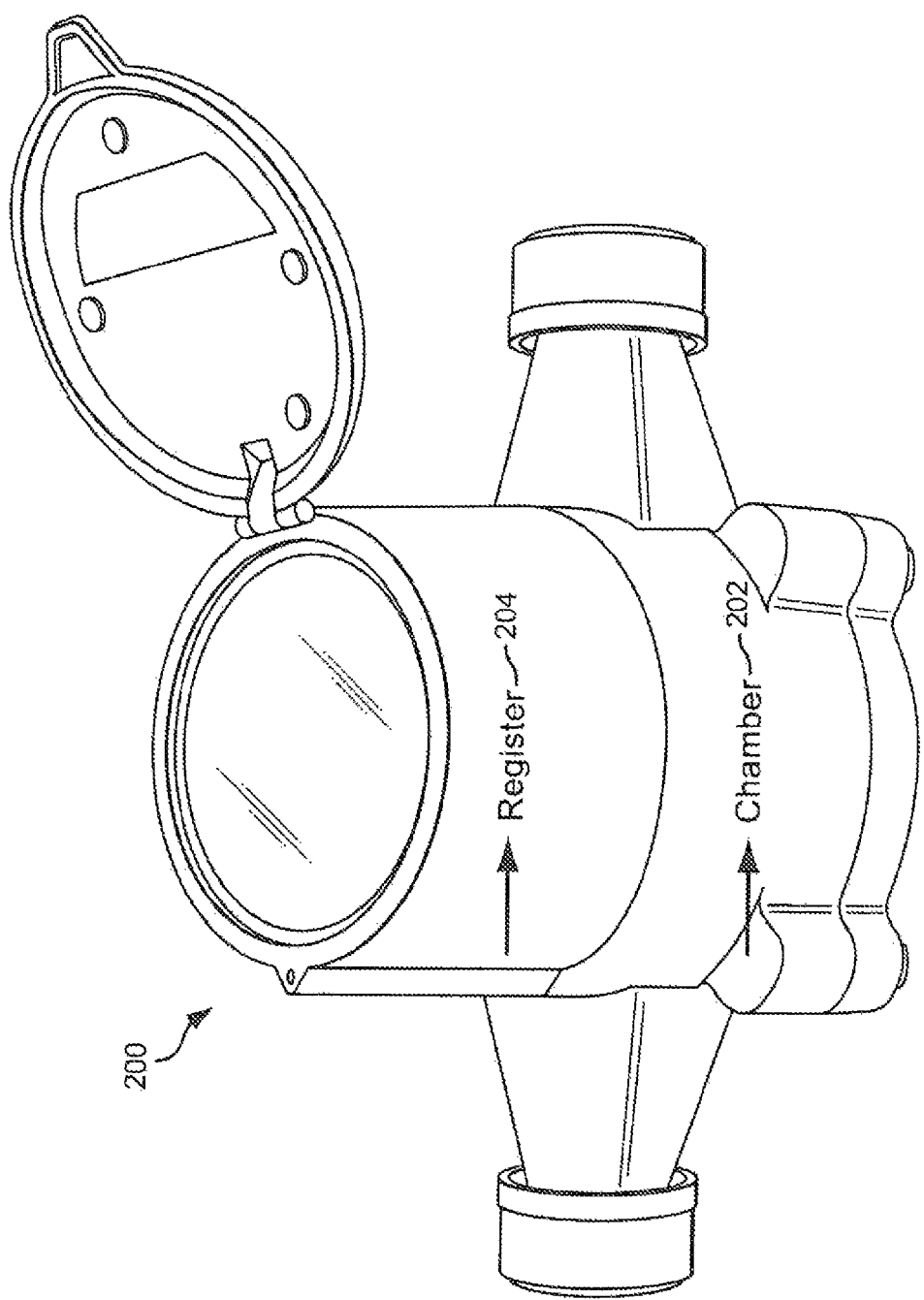
FIG. 2 is an illustration of a exemplary water meter.

FIG. 2 is an illustration of a exemplary water meter 200. In various embodiments, the water meter 200 measures water usage and generates water meter information regarding that usage.

A typical analog water meter comprises two major components including the chamber 202 and the register unit 204. Both units may be sealed. In some embodiments, water usage data may be communicated from the chamber 202 to the register unit 204 magnetically. In one example, the chamber 202 may comprise a turbine, a transmitter magnet, and a pick-up magnet (not shown in FIG. 2). When a user draws water by turning on a tap or by flushing a toilet, water enters the chamber 202 which may turn the turbine. The transmitter magnet placed on top of the turbine may turn faster or slower as more or less water is drawn. The pick-up magnet in the register unit 204 may turn in response to each turn of the transmitter magnet. In response to the turns of the pick-up magnet, gears of dial in the register unit 204 may turn to mark water usage data. In one example, a gallon of water will correspond to a set number of rotations of the turbine in the chamber 202.

In some embodiments, an electronic circuit converts the turns of the pick-up magnet to a digital pulse output. The make of the meter 200 (i.e., diameter of the turbine), the schedule of the water pipe (i.e., diameter of pipe's hole), and the make of the pipe (e.g., PVC or brass) may determine how many turns of the transmitter magnet, or how many pulses, correspond to a gallon of water. The number of pulses per gallon is called the k-factor of the meter 200.

In some embodiments, the register unit 204 of the water meter 200 is connected to the chamber via a bayonet mount. The bayonet mount may have a tamper proof lock to prevent users from temporarily removing and reconnecting the register just before the meter reader person arrives thus using water without paying for it.

Figure 3:
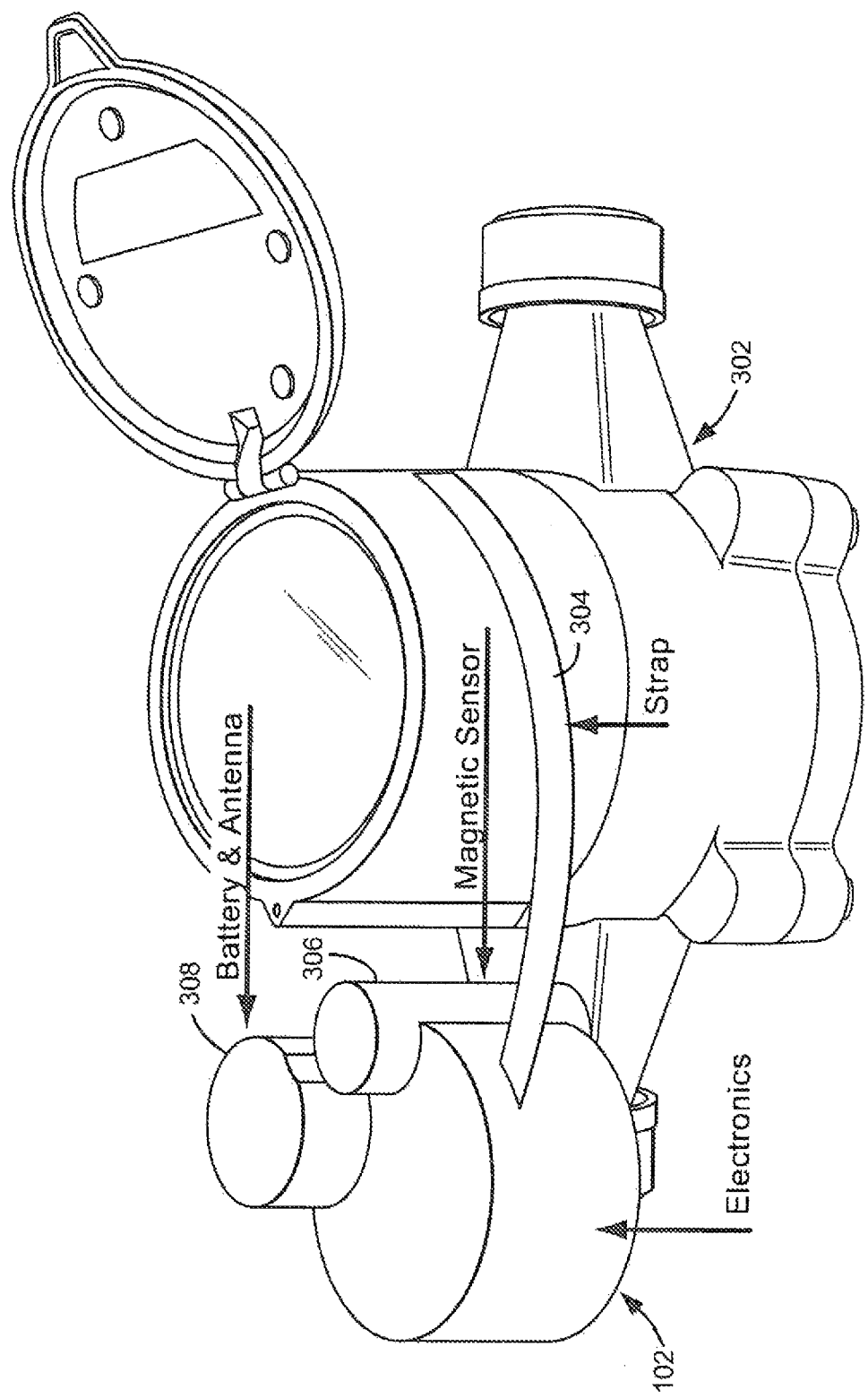
FIG. 3 is an illustration of an exemplary meter device coupled to a water meter.

FIG. 3 is an illustration of an exemplary meter device 102 coupled to a water meter 302. In some embodiments, the meter device 102 may install on existing standard water flow meters. The meter device 102 may not interfere with the operation of the water meter 302 or with manual reading of the water meter. Magnetic sensors of the meter device 102 may detect water flow and the meter device 102 may automatically report water usage data. In one example, the meter device 102 provides the water usage data via secure wireless data transmission using a standard cellular network (e.g., at 850 MHz or 1900 MHz frequencies). The cellular radio may not interfere with the operation of automatic meter reading equipment. The meter device 102 may also comprise a water resistant enclosure.

The meter device 102 may be configured to detect and/or receive water usage data from the water meter 302. The water usage data may then be provided to another digital device (e.g., via an antenna to the data management server 108 or the customer server 110). The meter device 102 may be coupled to the water meter 302. A meter device 102 may comprise a strap 304, a magnetic sensor 306, as well as a battery and antenna 308.

In some embodiments, the meter device 102 is coupled to the water meter 302. In FIG. 3, the meter device 102 comprises a strap 304 to couple the meter device 102 to the water meter 302. The strap 304 may be optional. In other embodiments, the meter device 102 may be coupled to the water meter 302 magnetically, mechanically (e.g., bracket and screws), and/or electrically. In one example, the meter device 102 is electrically coupled to the meter device 102 via one or more wires (e.g., a processor of the meter device 102 may be electrically coupled to one or more components of the register unit and/or the chamber of the water meter 302). The meter device 102 may be coupled to the water meter 302 in any number of ways.

In some embodiments, the meter device 102 may be coupled to any portion of the plumbing or piping. In one example, the meter device 102 is located at or near a water shut-off valve. In this example, the meter device 102 may be configured with a chamber and ability to detect water usage apart from a water meter 302.

Those skilled in the art will appreciate that although the meter device 102 is depicted as being mechanically coupled to the water meter 302 in FIG. 3, the meter device 102 and the water meter 302 may comprise the same device. In one example, the water meter 302 may be configured to monitor water usage and wirelessly provide water usage data to another digital device.

The magnetic sensor 306 is a sensor that detects water usage (e.g., water flowing through the chamber or changes in the register of the water meter 302 with the use of magnets). In some embodiments, the magnetic sensor 306 has sufficient sensitivity to pick up the change of magnetic field in the transmitter magnet of the water meter 302. Using an electronic circuit, analog values may be amplified and converted to a digital pulse output. The micro-controller component may count the raise, the fall, and the duration of each pulse and thus compute and record the gallons pa minute usage information. The usage information may be transmitted via the antenna of the battery and antenna 308 to another digital device (e.g., the data management server 108).

In some embodiments, the meter device 102 may be electrically coupled to the water meter 302 and receive water usage data directly for the register unit. In one example, the meter device 102 may receive water usage data from the dial of the register. In some embodiments, a magnet may not be used to retrieve or generate water usage information.

The battery and antenna 308 may comprise a power source and wireless transmission antenna. In some embodiments, the power source is a battery such as a lithium-ion, nickel metal hydride, or lithium-thionyl chloride battery. In some embodiments, the battery and antenna 308 comprises a solar panel in addition to or in place of the battery. The battery and antenna 308 may also comprise high power capacitors discussed further herein. In various embodiments, the meter device 102 may be coupled to a separate power source such as AC power (e.g., through the residence or business). The meter device 102 may also retain a battery in addition to access to AC power in order to continue operating in case of AC power loss or an outage.

The battery and antenna 308 may comprise any antenna configured to wirelessly communicate with a digital device) (e.g., the data management server 108 and/or the customer server 110 via the communication network 112). The meter device 102 may operates at temperatures from −20° C., to 85° C. Those skilled in the art will appreciate that the meter device 102 may operate at any temperature or humidity.

In some embodiments, the meter device 102 and/or the water meter may be underground. In one example, a buried container may contain the meter device 102. In some embodiments, the antenna of the battery and antenna 308 may be coupled to a metallic portion of the container to enhance an operational range of the antenna.

Figure 4:
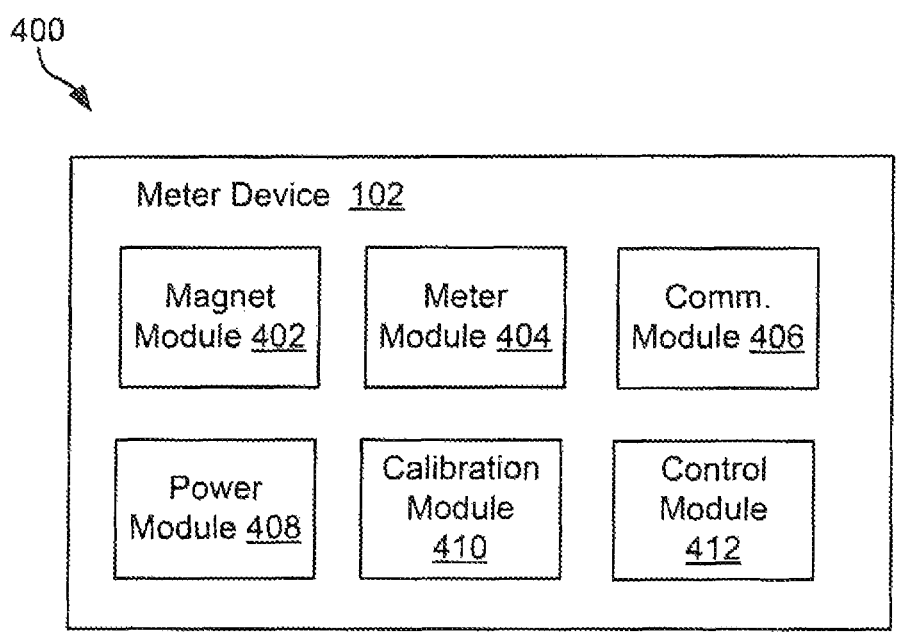
FIG. 4 is a block diagram of the exemplary meter device in some embodiments.

FIG. 4 is a block diagram 400 of the exemplary meter device 102 in some embodiments. The meter device 102 may comprise a magnet module 402, a meter module 404, a communication module 406, a power module 408, a calibration module 410, and a control module 412. In various embodiments, the meter device 102 may detect water usage data from the water meter 102 through one or more magnets, a pulse counter, and/or through a direct electrical connection with the water meter.

The magnet module 402 may comprise any number of magnets and sensors for detecting changes in magnetic field and/or current of the water meter. The magnets may comprise any magnetic material. In some embodiments, the magnet module 402 comprises two sensors to detect changes in the magnetic field of the water meter. The meter module 404 may detect the magnetic changes in the sensors and generate water usage data reflecting water usage.

In some embodiments, the meter module 404 may comprise a pulse counter. The pulse counter detects pulses in the water meter in order to determine water consumption and/or generate water usage data. In some embodiments, each pulse corresponds to a half a turn of the transmitter magnet of the water meter (i.e. a polarity change). The read resolution of the meter device 102 may be extremely high.

The magnet module 402 may comprise any number of magnets with alternating polarity on the circular area of the least significant digit of the dial on the register of the water meter. The polarity changes of these magnets may be picked up by a reed switch to generate a pulse output. Any number of magnets may be used. In one example, 16 magnets provide a one cup resolution and therefore, each pulse corresponds to one cup of water. In some embodiments, the reed switch based design may require less power and may be cheaper to manufacture.

The usage resolution is the interval of reporting the water usage from the meter device 102 to the back-end (e.g., the data management server 108 and/or the customer server 110). The usage resolution may be much lower than the read resolution.

The maximum frequency of the pulses may depend on the rate of the water flow which, in turn, may depend on the water pressure and the schedule of the pipe. For example, in the San Francisco Bay Area, a typical residential water service has a dynamic water pressure of 65 PSI and a ¾ or 1 inch supply line. This roughly translates to about 17 to 32 gallons per minute maximum water low rate.

Here is a table of common units of water:

| | |
|---|---|
| 1 CCF | 748 Gallons |
| 1 Gallon | 16 Cups |
| 1 Cup | 8 Ounces |
| 1 Ounce | 6 Teaspoons |
| 1 Pint | 2 Cups |
| 1 Quart | 2 Pints |
| 1 Quart | 4 Cups |
| 1 Gallon | 4 Quarts |

In one example, assume a 32 gallon per minute flow. This corresponds to 512 cups per minute, or 4096 ounces per minute, or 24,576 teaspoons per minute. On a per seconds scale, the flow rate of the meter is 0.53 gallons per second, or 8.53 cups per second, or 68.27 ounces per second, or 409.6 teaspoons per second maximum flow rate.

| Number of Pulses | Water unit/second |
|---|---|
| 1000 | 1 gallon |
| 62.5 | 1 cup |
| 7.8 | 1 ounce |
| 1.3 | 1 teaspoon |

Figure 14:
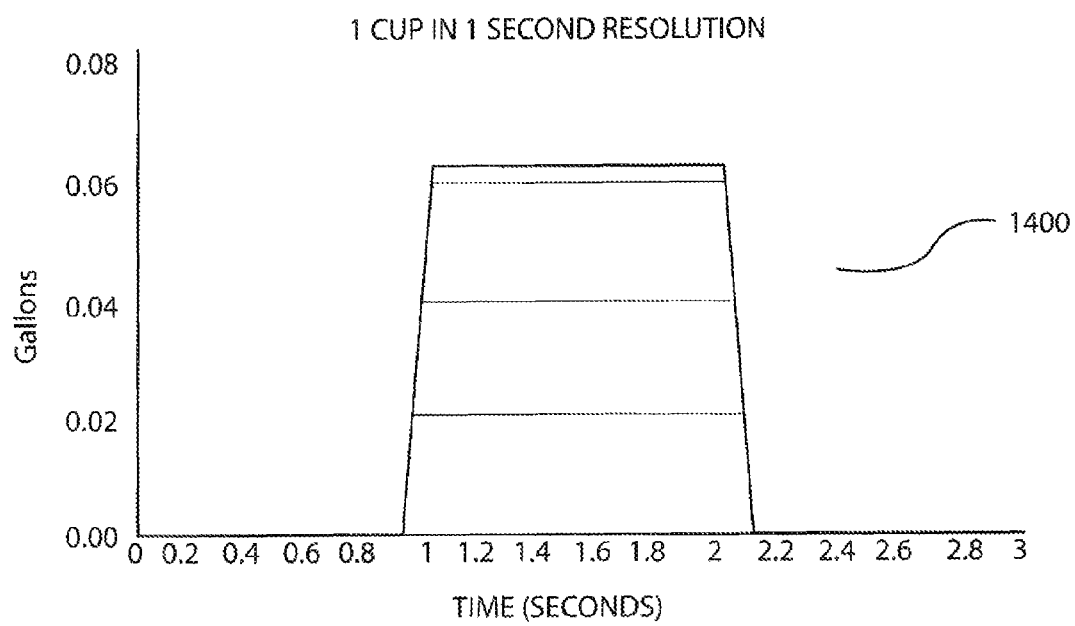
FIG. 14 is a graph depicting water usage at a specific usage resolution.

A k-factor of 1000 is 1000 pulses per gallon. Therefore, a 0.53 gallons per second maximum flow rate (corresponding to 32 gallon per minute flow rate—the maximum residential flow rate) corresponds to a pulse frequency of 0.53*k-factor which, in this example, is 530 Hz (i.e., 530 pulses per second read resolution). This level of resolution may not be necessary. For example, as shown in graph 1400 of FIG. 14, the duration of each pulse may not need to be stored (the duration of each pulse may correspond to the change in the transmitter magnetic polarity) at this scale. The resolution may be lowered to count pulses including duration and then summarize the total over a predetermined interval (e.g., once per second) for detailed analysis of usage.

The system may lower the usage resolution based on a parameter that can be adjusted. In one example, for and in-depth analysis, a higher usage resolution may be used for some applications (e.g., billing).

The resolution may be increased or decreased over time (e.g., manually or automatically). In one example, the resolution is changed based on a command received via the antenna (e.g., via the antenna of the communication module 406). In one example, a higher usage resolution may be used to improve the model for a given household. Once the detailed model for the household has been identified, and the user has information needed to reduce water usage, the resolution may be lowered.

The level of resolution may be based on deployment options. In a consumer setting, where the user wishes to deploy a meter device 102 and get real-time usage data, a once per second resolution may be used. For applications where real-time usage is not necessary (e.g., utility deployment), a usage resolution of once every 10 minutes may be more than adequate to identify most water activities and at the same time reduce the data collection cost associated with higher resolution usage data communication (e.g., save power).

In some embodiments, the communication module 406 transmits water usage data at predetermined times (e.g., at a specific time and/or day), at specific intervals (e.g., every hour), once a specific amount of water is used, or upon the detection of a pattern of use. In one example, the user or utility may configure the meter device 102 to transmit water usage data at specific times (e.g., 2:00 AM everyday) and/or days (e.g., 12:00 AM Mondays and Thursdays or the 3rd, 10th and 24th of every month). In some examples, the meter device 102 may be configured by the user or utility to transmit water usage data at specific intervals.

In some embodiments, the meter device 102 may be configured to provide water usage data after a set number of readings or an amount of data is collected. In one example, the meter device 102 may detect when water consumption is in process and only be active to collect water usage data during times of consumption. Once a specific number of readings, amount of data, and/or specific duration of water usage data is reached, the meter device 102 may transmit the water usage data. In one example, the meter device 102 is coupled to a water meter that is used to measure water consumption of a household. If the family goes on a two week vacation, no water or little water may be consumed and the meter device 102 may collect little water usage data (if any at all). Once the family returns, the meter device 102 may continue to collect water usage data and provide the water usage data once a precondition (e.g., a threshold quantity of water usage data) is met.

In some embodiments, an activity pattern detection system could potentially run entirely on a micro-controller of the meter device 102. The meter device 102 may keep track of usage by activity and transmit these totals (e.g., every 24 hours). This may significantly reduce the server load, the size of the data set and the cost of the communications. In some embodiments, a pattern of water usage may be recognized and the meter device 102 configured to transmit water usage data when one or more patterns (or iterations of patterns) is identified. For example, a specific amount of water may be used during irrigation events followed by business and/or residential use. The patterns of use may be detected by the meter device 102. Further, the meter device 102 may identify larger events of water consumption and provide the water usage data during or after larger events of water consumption e.g., a pipe burst).

In one example, the meter device 102 may detect a common pattern of water usage. If an event is uncommon (e.g., 5 times the water usage of a normal day is detected over a short period of time), the meter device 102 may provide an alert and/or provide the water usage data to the data management server 108 and/or the customer server 110.

The communication module 406 may be configured to provide water usage data and device operational information to a digital device. In some embodiments, when a message is first sent to the data management server 108 or customer server 110, the data management server 108 or customer server 110 may register the meter device. In one example, the message from the meter device 102 may comprise an identifier that identifies the meter device 102. A receiving customer server 110 may register the meter device 102 based on the identifier.

As the communication module 406 transmits subsequent messages, the customer server 110 may log when and the number of messages received, water usage data, and/or device operational information. Device operational information may comprise a number of times the meter device 102 is restarted and/or turned off. In one example, the device could be restarted a result of malfunction or some manual intervention (e.g., replacing the battery).

In some embodiments, the communication module 406 transmits a heartbeat message once every five minutes. A sequence message may be sent once every 30 second if there has been usage. The data management server 108 and/or customer server 110 may log every heartbeat and sequence message to track usage of the meter device 102.

In various embodiments, the communication module 406 may be hardware such as a ZigBee module which ma communicate with a ZigBee module base-station. The base-station may pick up the water usage data in real-time and communicate this data to the customer server 110 (e.g., using the user's WiFi access to Internet) for usage analysis and cost-saving suggestions. The communication module 406 may comprise a cellular based communication module (e.g., GSM or CDMA wireless communication device).

The power module 408 may include a separate power supply and/or receive power externally (e.g., AC power). In one example, the power module 408 comprises one or more batteries. The batteries may be replaceable. In one example, the batteries may comprise replaceable Lithium batteries that may deliver, for example, between three and five years of service depending on usage. The power module 408 may comprise capacitors configured to be charged via AC power and/or batteries. Further, the power module 408 may comprise a solar power to generate power from sunlight.

In some embodiments, the power module 408 receives power externally and may comprise batteries for back-up in case external power fails. For example, the power module 408 may be configured to receive power from an AC power source (e.g., from a residence or business). The power module 408 may charge one or more rechargeable batteries with the AC power. If the external power fails, the power module 408 may continue to power the meter device 102 with the batteries. In one example, the meter device 102 may be powered by the batteries for 14 days without AC power.

The power module 408 may comprise lithium batteries. In some embodiments, assuming GPRS transmission, a 6 AH battery may support up to 4 GPRS data transmissions per day for one year while collecting data on a high resolution basis (e.g., once per second) but transmit the data 4 times a day to save power.

In some embodiments, in addition to batteries, the power module 408 may generate power based on the flow of the water to generate power. In one example, a coil is held close to a moving magnet to generate electricity. The water meter may have all the necessary elements: a turbine that turns with the flow of the water and a moving magnet to generate sufficient amount of electricity to trickle charge batteries or capacitors to power the electronics and communications needs of the device.

The meter device 102 may comprise a calibration module 410 configured to calibrate the meter device 102. In some embodiments, meter reading devices may need to be calibrated. In one example, calibration occurs when the k-factor is computed and/or verified. The type of the water meter and the schedule of the pipe coupled to the water meter may in large part determine its k-factor, but the age of the meter may have an impact on accuracy as well Many analog meters may under-register with age.

During the installation of the meter device 102, the installer may calibrate the meter device and verify the k-factor. In some embodiments, the installer (e.g., professional water meter installer) uses a calibration device to simplify the task of verifying the k-factor. The calibration module 410 may comprise a reading device as well as two switches: a toggle switch to start/stop pulse counting for a known amount of water, and a switch to dismiss a reading. In one example, to calibrate the meter device 102 manually and calculate the k-factor, an installer may press the toggle switch, draw a pint (a quarter of gallon of water and press the switch again. The installer may repeat this step any number of times (e.g., three times) to compute the average k-factor. The other switch may allow the installer to dismiss a reading to handle mistakes.

In some embodiments, the calibration module 410 calculates and/or verifies the k-factor automatically. In one example, the meter device 102 may receive a command to verify the k-factor (e.g., from a user or utility via the antenna). The calibration module 410 may detect the amount of water over a predetermined time and calculate or verify the k-factor. The calibration module 410 may provide the k-factor to the utility or customer in any number of ways. In one example, the calibration module 410 provides the k-factor to the utility wirelessly.

The control module 412 may be configured to control the meter device 102. In various embodiments, the meter device 102 may receive commands wirelessly to automatically calibrate, provide any available water usage data, turn off the water, identify the meter device 102, identify a Water meter, troubleshoot the meter device 102, or deactivate the meter device 102. In some embodiments, commands may be sent remotely by a qualified professional (such as an employee of the utility). In some embodiments, one or more commands may be provided by the user. The control module 412 may receive commands remotely or locally (e.g., manually).

In some embodiments, the control module 412 may provide identifiers that identify the meter device 102 and/or a water meter based on a received command. Further, the control module 412 may be configured to perform troubleshooting operations and transmit error codes or descriptions if an error occurs. The control module 412 may also be configured to update the firmware of the meter device 102 and/or identify any firmware components upon receiving the appropriate command.

The meter device 102 may also make any number of reads. In one example, the meter device 102 may make 3,000 to 250,000 reads a month. Further, batteries of the meter device 102 may last any number of years. In one example one or more batteries may power the meter device 102 for five years before being replaced.

A module may be hardware, software (e.g., including instructions executable by a processor), or a combination of both. In one embodiment, the meter device 102 may comprise more less, or functionally equivalent components and modules.

Figure 5:
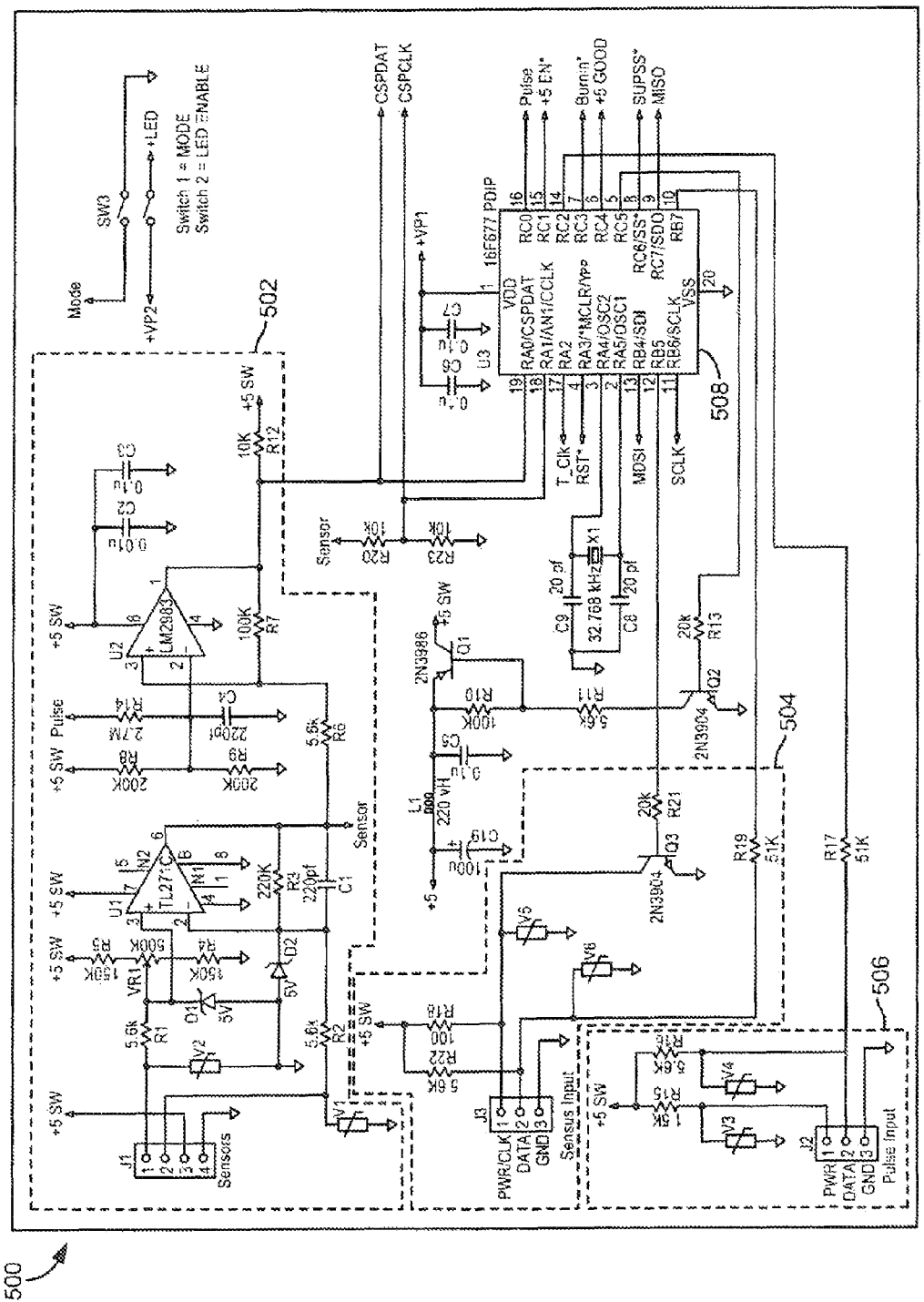
FIG. 5 is a circuit diagram an exemplary meter device for processing input in some embodiments.

FIG. 5 is a circuit diagram 500 an exemplary meter device 102 for processing input in some embodiments. The circuit diagram 500 depicts circuits for receiving data from a water meter. In this circuit diagram 500, there are at least three different ways in which data may be received from the water meter including through a magnetic sensor (see magnetic sensor circuit 502), through data received from a register unit of the water meter (see register data circuit 504), and through pulse input (see pulse input circuit detector 506). The output of the magnetic sensor circuit 502, the register data circuit 504, and the pulse input detector circuit 506 is received by the programmable integrated circuit (PIC) 508.

The magnetic sensor circuit 502 may be configured to receive magnetic pulses from the water meter and detect water usage as described herein. In some embodiments, a differential amplifier may be used to compensate for errors that may be caused by flaws in the magnetic field of the water meter (e.g., caused by large metal objects in close proximity to the magnets of the meter device 102 and/or the water meter). In some embodiments, the meter module 404 and/or the magnetic sensor circuit 502 may detect 40 revolutions per second turbine speed of the water meter.

The register data circuit 504 may be configured to couple directly with a register or dial of a register of the water meter to receive water usage data. In this example, an agreement may be reached between a manufacturer of the water meter and the operator of the meter device 102 to access the water usage data of the meter.

The pulse input detector circuit 506 may be used to detect pulses in the water meter as described herein. In some embodiments, the meter module 404 and/or the pulse input detector circuit 506 may detect 80 pulses per second.

Those skilled in the art will appreciate that only one of the magnetic sensor circuit 502, the register data circuit 504, and the pulse input detector circuit 506 may be present in the meter device 102 in some embodiments.

Figure 6:
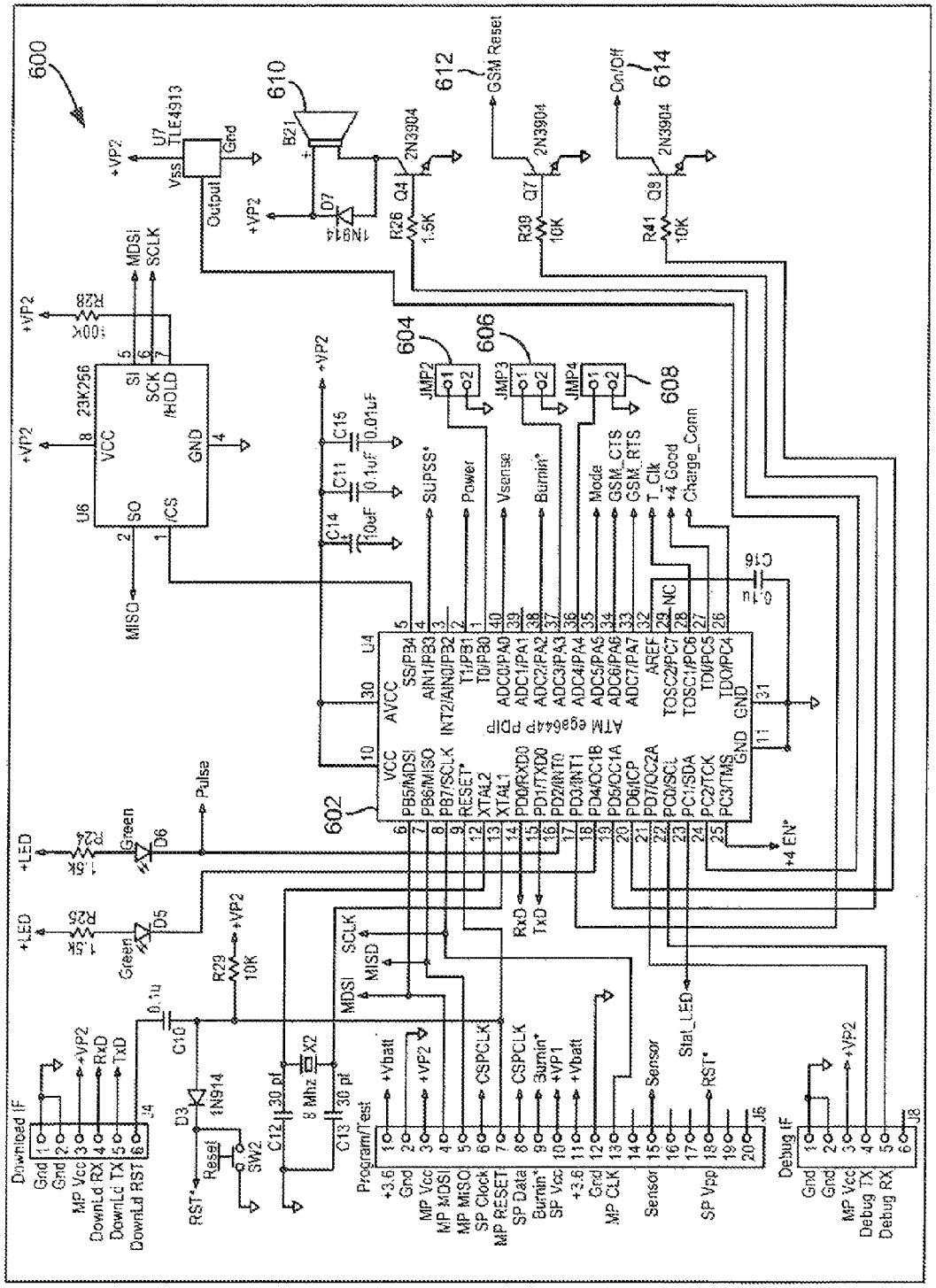
FIG. 6 is a circuit diagram an exemplary meter device for processing data for transmission in some embodiments.

FIG. 6 is a circuit diagram 600 an exemplary meter device for processing data for transmission in some embodiments. The circuit diagram 600 indicates that information is received from circuit diagram 500 of FIG. 5 and prepare to transmit via a transmitter (e.g., a GSM device) (see output circuitry to transmitter 612).

In various embodiments, a microcontroller 602 receives the data from the water meter and prepares the data for delivery to another digital device via the output circuitry to transmitter 612. Jumpers 604, 606, and 608 may configure the microcontroller 602 automatically or manually. In some embodiments, the jumpers 604, 606, and 608 may be used to configure the microcontroller 602 to receive data via the magnetic sensor (see magnetic sensor circuit 502), via the data received from the register unit of the water meter (see register data circuit 504), or via the pulse input (see pulse input circuit detector 506).

The circuit diagram 600 may also comprise a speaker 610 that emits sound upon an error or for troubleshooting. In one example, the circuit diagram 600 may be configured to emit a sound via the speaker 610 when the battery power is low or AC power has failed.

The on/off circuitry 614 may activate or deactivate the meter device 102.

Figure 7:
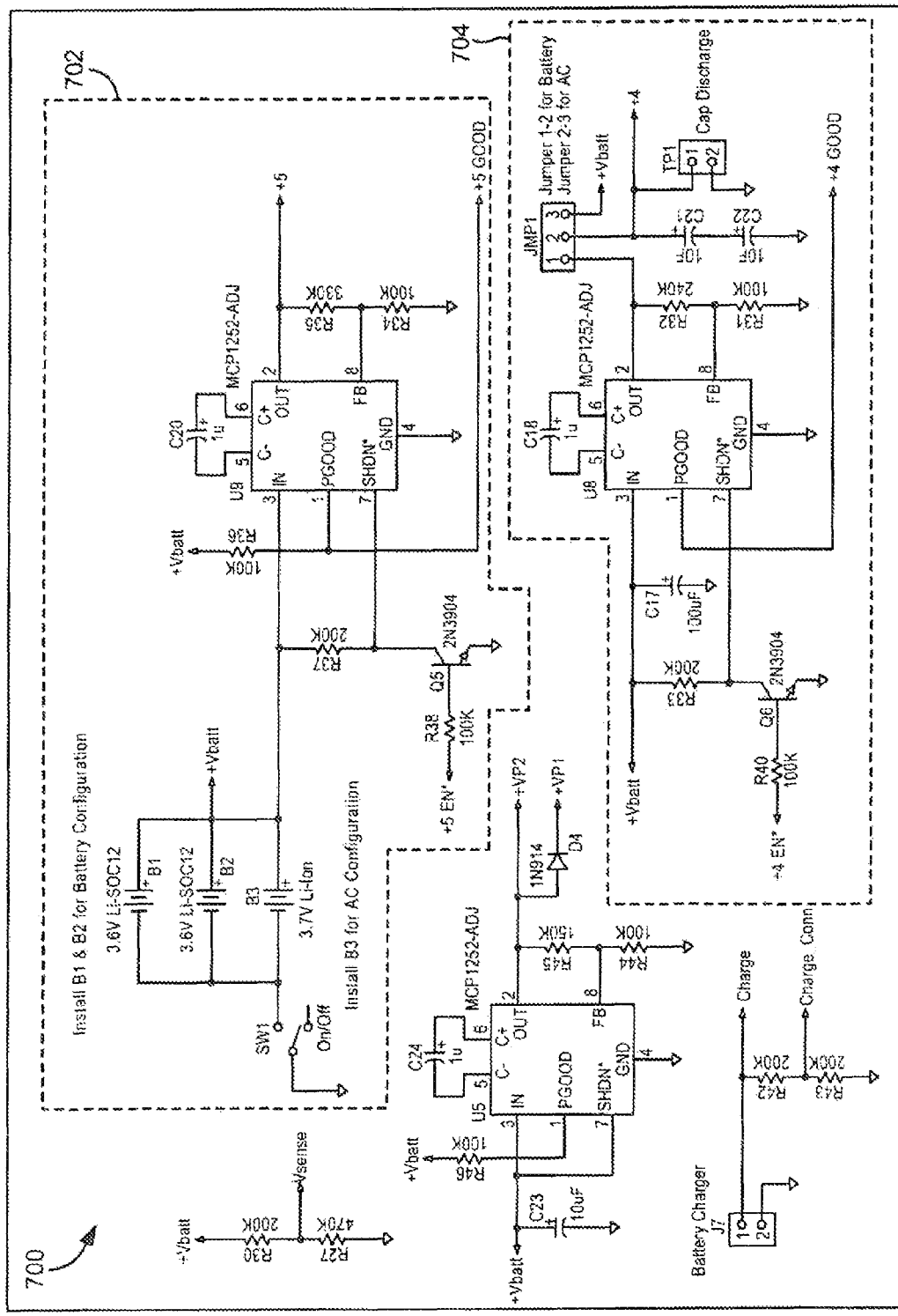
FIG. 7 is a circuit diagram an exemplary meter device for power management in some embodiments.

FIG. 7 depicts circuit diagrams 700 for an exemplary meter device for power management in some embodiments. Battery circuitry 702 may receive power through one or more batteries. The batteries may be used to charge a capacitor (see C20). In some embodiments, voltage from the batteries is stepped up to charge the capacitor C20. The capacitor C20 and/or the batteries may be used to power the transmission of water utility data and/or generate the water utility data.

In battery and AC power circuitry 704, one or more batteries and/or a capacitor (see C18) may be charged by AC power. AC power may be received from an external source. In some embodiments, a jumper may be set to configure the circuit to receive power from a battery or AC power.

In various embodiments, the battery and AC power circuitry 704 detects the length of time to charge the capacitor C18. When the time to charge capacitor C18 takes longer than a specified duration, the capacitor may be starting to fail and may require replacement. The battery and AC power circuitry 704 may provide a signal and/or alert (e.g., with the speaker 610 of FIG. 6) to indicate that the capacitor C18 needs to be replaced.

Those skilled in the art will appreciate that there are many different ways to power the meter device 102 beyond those circuits shown in FIG. 7.

Figure 8:
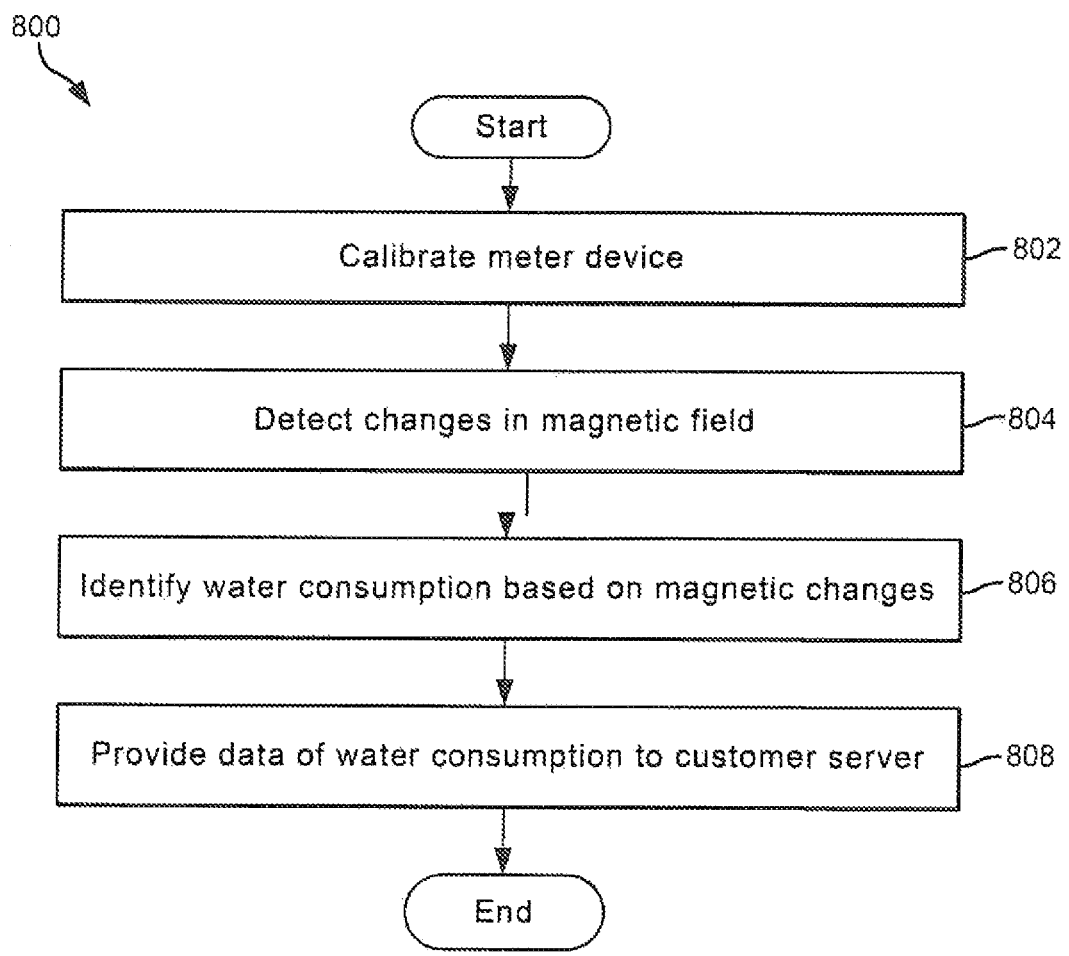
FIG. 8 is a flowchart, for providing water usage data in some embodiments.

FIG. 8 is a flowchart 800 for providing water usage data in some embodiments. In step 802, the calibration module 412 calibrates the meter device 102. In some embodiments, the calibration module 412 calculates and verifies the k-factor of the water meter. The k-factor may be based, in part, on the type of water meter, flow of water over a predetermined period of time, and diameter of pipe coupled to the water meter.

In step 804, the meter device 102 may generate water usage data based on data received from the water meter and the k-factor. In some embodiments, the magnet module 402 comprises sensors and magnets used to detect changes in magnetic fields to calculate water usage. The meter module 404 may then identify water usage based on input from the magnet module 402 in step 806.

In another embodiment, the meter module 404 may be coupled with a register unit of the water meter. The meter module 404 may then receive water usage data directly from the register unit. In various embodiments, the meter module 404 calculates water usage based on pulses detected from the water meter as described herein.

In one example, the meter module 404 may provide a count of gallons as well as rate of the flow (e.g., similar to a car's odometer and speedometer). Conventional analog meters may be essentially an odometer for water consumption. The rate of water usage may allow for the computation of usage activities based on pulse pattern matching.

The resolution of the readings may determine the interval when the number of pulses is added. In one example, the meter module 404 determines a summation period is determine (e.g., a second), and after each summation period, a number of detected pulses is added. The summation and time (e.g., in milliseconds) may be stored. In one example, the summation and time is stored in two arrays. The communication module 406 may provide the summation and/or the time to another digital device in step 808

In some embodiments, a heartbeat may be sent from the meter device 102 to another digital device at predetermined intervals. In one example, the summation, communication and heartbeat intervals are set to 1 second, 30 seconds and 5 minutes.

Figure 15:
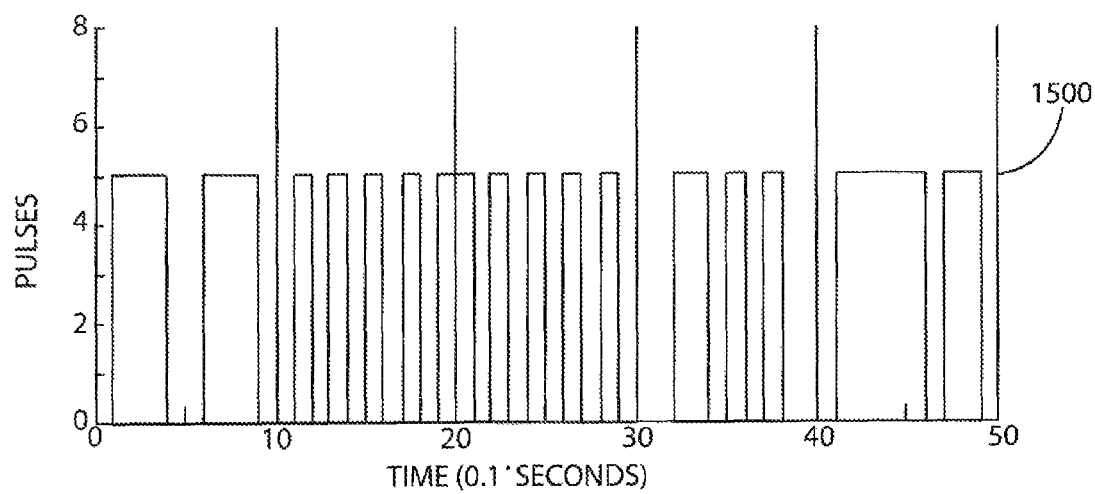
FIG. 15 is a graph depicting an example of a pulse frequency graph in which darker lines delimit seconds.
Figure 16:
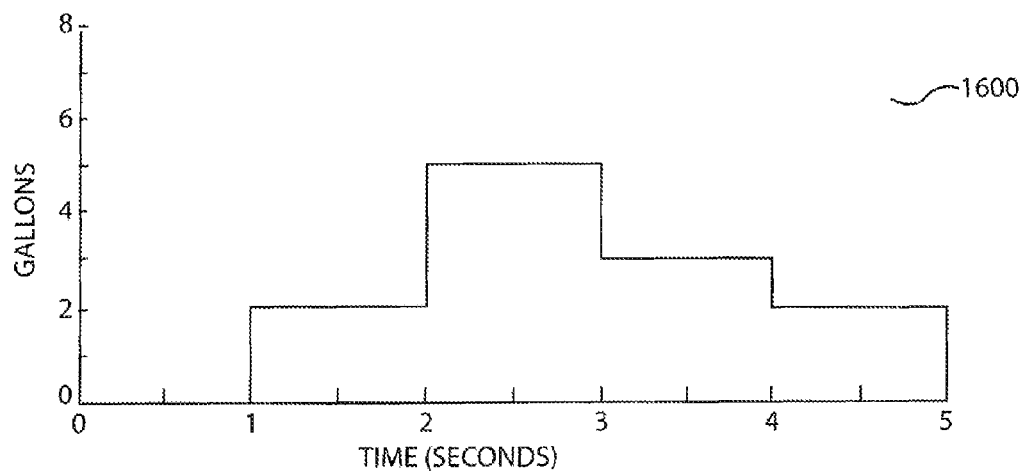
FIG. 16 is a graph depicting gallon per unit of time corresponding to the graph of FIG. 15.

FIG. 15 is an example of a pulse frequency graph 1500. The darker lines delimit seconds. The gallon per unit of time corresponding to the above graph is shown below. For the sake of this example, a k-factor of 1 is assumed (i.e., one pulse per gallon). The signatures of activities may be represented in the gallon per second instead of number of pulses per second. The chart below the height of each bar, as shown in graph 1600 of FIG. 16, may be the sum of the pulses during the interval divided by the k-factor (which may, in some embodiments, be offset by 1 second).

In step 808, the communication module 406 may provide water usage data (e.g., based on data received via magnets, pulses, or directly from the water meter register unit) to another digital device such as the customer server 110 or the data management server 108.

Figure 9:
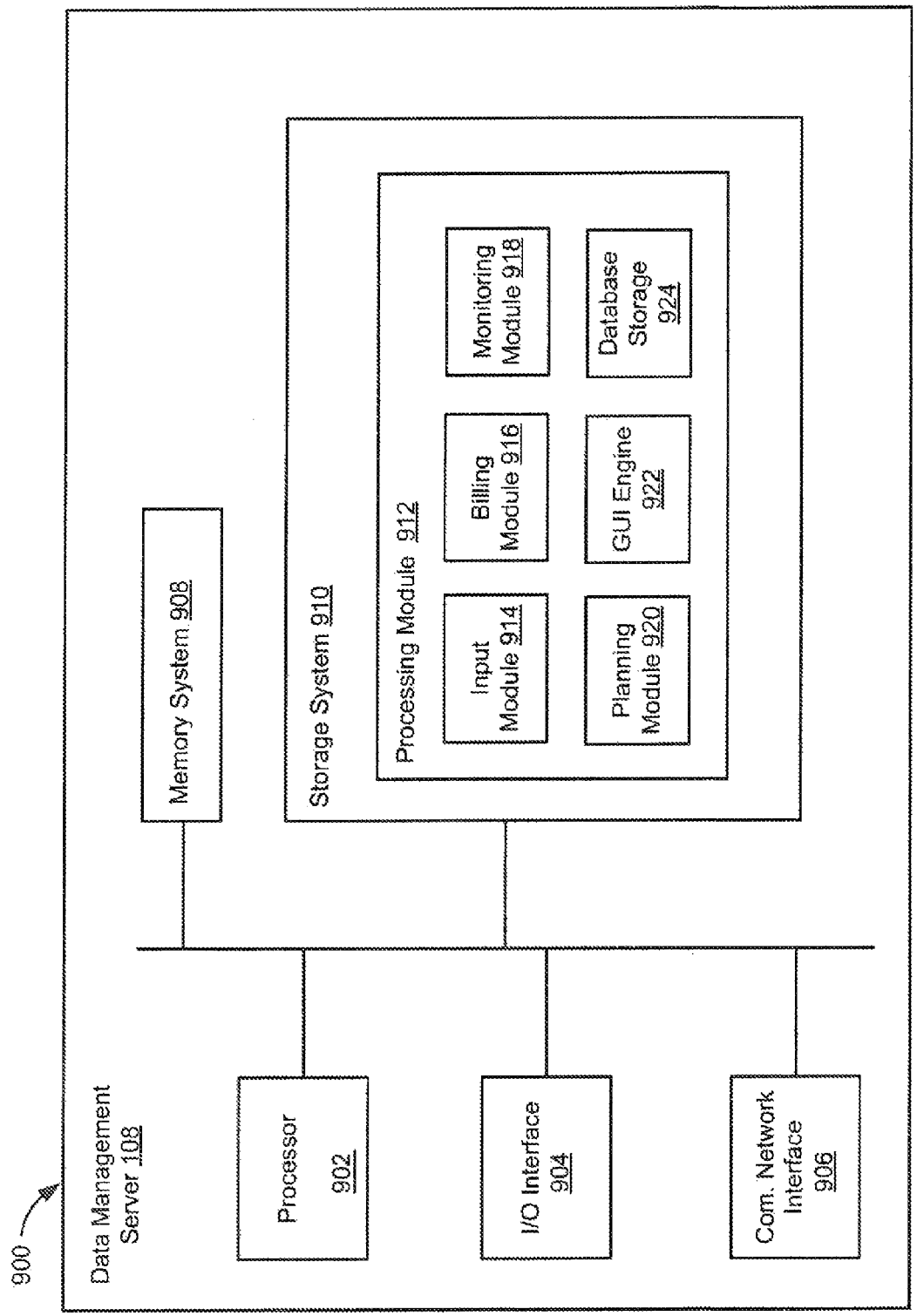
FIG. 9 is an exemplary box diagram of a data management server.

FIG. 9 is an exemplary box diagram 900 of a data management server 108. The data management server 108 may be operated by a utility. In exemplary embodiments, the data management server 108 comprises a processor 902, input/output (I/O) interface 904, a communication network interface 906, a memory system 908, and a storage system 910. The processor 902 may comprise any processor or combination of processors with one or more cores.

The input/output (I/O) interface 904 may comprise interfaces for various I/O devices such as, for example, a keyboard, mouse, and display device. The exemplary communication network interface 906 is configured to allow the data management server 108 to communication with the communication network 112 (see FIG. 1). The communication network interface 906 may support communication over an Ethernet connection, a serial connection, a parallel connection, and/or an ATA connection. The communication network interface 906 may also support wireless communication (e.g., 802.11 a/b/g/n, WiMax, LTE, WiFi). It will be apparent to those skilled in the art that the communication network interface 906 can support many wired and wireless standards.

The memory system 908 may be any kind of memory including RAM, ROM, or flash, cache, virtual memory, etc.

In various embodiments, working data is stored within the memory system 908. The data within the memory system 908 may be cleared or ultimately transferred to the storage system 910.

The storage system 910 includes any storage configured to retrieve and store data. Some examples of the storage system 910 include flash drives, hard drives, optical drives, and/or magnetic tape. Each of the memory system 908 and the storage system 910 comprises a computer-readable medium, which stores instructions (e.g., software programs) executable by processor 902.

The storage system 910 comprises a plurality of modules utilized by embodiments of the present invention. In some embodiments, the storage system 910 comprises a processing module 912 which comprises an input module 914, a billing module 916, a monitoring module 918, a planning module 920, a GUI engine 922, and database storage 924.

The input module 214 may be configured to receive water usage data from the water meter and/or the meter device 102. Typically, a human meter reader will collect readings from a number of water meters and the readings are input into the data management server 108 via the input module 914. In some embodiments, a smart meter may be used (or a combination of a water meter and a meta device 102) to retrieve water usage data wirelessly and/or over a network. The input module 914 may store the water usage data within the database storage 924.

In some embodiments, the input module 914 may be configured to communicate and control the meter device 102. In some examples, the input module 914 may transmit requests for updated water usage data commands to activate or deactivate the meter device 102, commands to troubleshoot or repair the meter device 102, and/or commands to upgrade the firmware of the meter device 102.

The billing module 916 is configured to generate bills for water customers based on the water usage data. In various embodiments, at specific times and dates, the billing module 916 may retrieve water usage data and generate a bill for each customer. The bill may then be provided to the customer (e.g., via US mail or electronically). The billing module 916 may also track payment.

The monitoring module 918 is configured to monitor multiple water meters and/or meter devices 102. In some embodiments, the monitoring module 918 monitors data received by the input module 914. If there is a spike or unusual water consumption, the monitoring module may send an alert to affected customers, the utility, and or the customer server 110.

The planning module 920 is configured to plan water usage. In some embodiments, the planning module 920 compares current usage to expected usage. Expected usage may be based on current events (e.g., record heat wave) and/or past behavior (e.g., water consumption during the same period of time for the last five years). The planning module 920 may simply provide tools for analysis or provide recommendations to encourage water conservation before the need becomes too great.

The GUI engine 922 is optional and may present a web page where customers may access the data management server 108 to monitor water usage, pay bills, and retrieve information. In some embodiments, the GUI engine 922 may also provide water usage data from the meter device to the customer server 110.

The database storage 924 is any data stricture that is configured to store water usage data from the water meter and/or the meter device 102. In one example, customer identifiers, water meter identifiers, meter device 102 identifiers, water meter data, and the times that water meter data was received may be stored in the database storage 924.

Although the data management server 108 and the customer server 110 are shown separately on FIG. 1, those skilled in the art will appreciate that the customer server 110 or the data management server 108 may perform any number of functions. In one example, all or part of the processing module 912 may be at the customer server 110 or the database storage server 106.

In various embodiments, the services provided by the customer server 110 are integrated onto the data management server, in other embodiments, the GUI engine 922 may be on the customer server 110. In yet other embodiments, water usage data may be provided to the customer server 110 which may then provide the water usage data to the data management server 108 for storage or to verify the water meter readings.

In various embodiments, utilities may integrate data and services with the customer server 110. In one example, the data management server 108 may provide the option to bill users for access to the customer server 110.

In various embodiments, systems and methods discussed herein may be implemented with one or more digital devices, in some examples, some embodiments discussed herein may be implemented by a computer program (instructions) executed by a processor. The computer program may provide a graphical user interface. Although such a computer program is discussed, those skilled in the art will appreciate that embodiments may be performed using any of the following, either alone or in combination, including, but not limited to, a computer program, multiple computer programs, firmware, and/or hardware.

Figure 10:
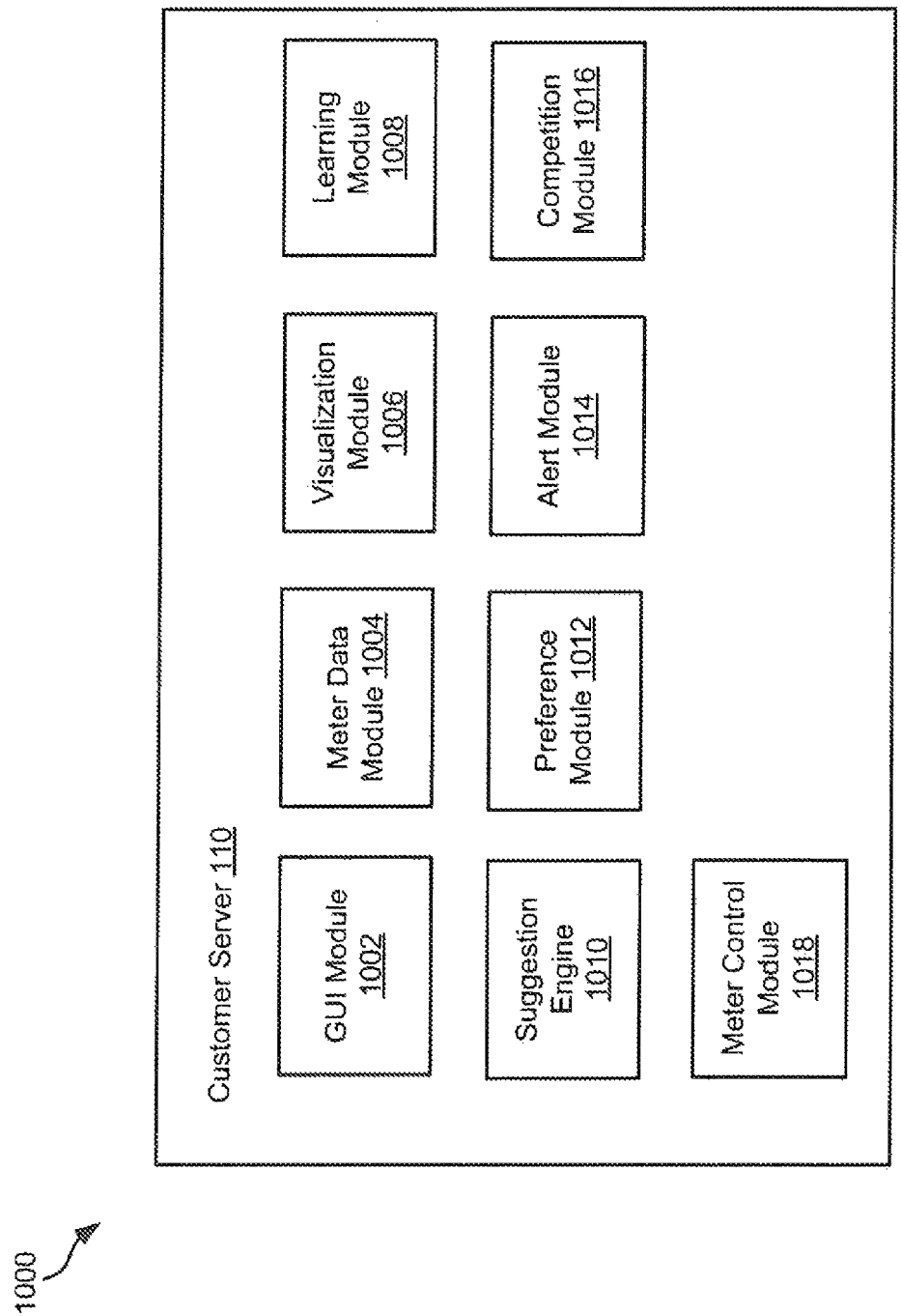
FIG. 10 is an exemplary box diagram of a customer server.

FIG. 10 is an exemplary box diagram 1000 of a customer server 110. The customer server 110 may receive water usage data from the water meter, meter device 102, and/or the data management server 108. The customer server 110 may provide a user a web page (e.g., a dashboard) in which the user may interact with the water usage information. In some embodiments, the customer server 110 allows users to create customizable reports and charts so that the user can visualize water consumption over time, identify events and the related effect of water consumption (e.g., the number of gallons of water per bath) and the like. The user may enter competitions to reduce water consumption by individual goals or compete with others.

The customer server 110 comprises a GUI module 1002, a meter data module 1004, a visualization module 1006, a learning module 1008, a suggestion module 1010, a preference module 1012, an alert module 1014, a competition module 1016, and a meter control module 1018. The GUI module 1002 may provide the user an interface to visualize and interact with the water usage information. In various embodiments, the customer server 110 may be hosted (e.g., Google or Amazon's cloud services), where basic elements of scalability may be already included in their service and distributed architecture.

In some embodiments, a user must first register with the GUI module 1002. In one example, the user registers with the GUI module 1002 by providing an identifier (e.g., username) and a password. In some embodiments, the user may be required to provide a water account number which may be verified against records at the utility. The user may be required to provide a model number or other identifier of the water meter and/or meter device 102. Once the user is authenticated/verified and registered, the user may receive access to water usage information via the web site.

The GUI module 1002 may provide any number of tools for the user to examine water usage. In some embodiments, the GUI module 1002 operates in conjunction with a client application on the user device 106. The client application may perform certain functions locally.

In some embodiments, the GUI module 1002 may also provide APIs that allow third-parties to access at least some water usage information. In some embodiments, the GUI module 1002 removes personal information before providing general water usage information (e.g., water usage information for a particular region or community).

In one example, an available API may be a standards-based, open API for external systems integration capable of importing historical data for comparisons. Water usage data and/or water usage information may be exported for analysis by third-party tools and systems. An available API may allow for direct access to data for use in other systems. Further, the GUI module 1002 may be configured (e.g., via an API) to automatically push collected usage data to existing database systems.

The meter data module 1004 may be configured to receive water usage data from the meter device 102, the water meter, and/or the data management server 108. In one example, the meter data module 1004 may receive water usage data from the meter device 102 via the communication network 112. In other embodiments, the operator of the data management server 108 may share water usage data regardless if it came from a meter device 102, smart meter, or traditional water meter that is periodically read by a meter reader.

In various embodiments, the visualization module 1116 is configured to provide visualizations (e.g., such as pie graphs, bar graphs, line charts, tables, and reports) to the user. The user may be able to interact with the visualization module 1116 to request specific types of visualizations (e.g., a pie chart and a bar chart), select one or more meter devices 102, select one or more activities, and/or select one or more durations of time (e.g., over the last week or the month of January of 2010). The visualization module 1116 may then generate the requested visualization(s).

In one example, a day's break down in a pie chart may be easily understandable to the user. In the pie chart, the user will be able to view activities on a daily, weekly, monthly and annual basis.

In one example, the visualization module 1006 may display a pie graph of water usage. Different activities may be characterized by the user or automatically categorized by the learning module 1008 (further described herein). For example, the pie graph may show water consumption identified by the amount of water consumed for showers, irrigation, and laundry. The categories may also relate to one or more business uses. Those skilled in the art will appreciate that there may be any number of characterizations.

In some embodiments, the user may identify an event of water consumption on a chart or table (e.g., 1.6 gallons at periodic times of the day) and identify the event as flushing a toilet. The visualization may then show the water consumed over a predetermined period of time that matches 1.6 gallons (or matches certain times) as being flushing a toilet. As such, the pie chart will allow the user to visualize the water consumption related to each plumbing fixture and consider the impact of replacing physical utilities and plumbing with new piping and fixtures.

Further, the user may identify a shower as consuming a certain amount of water. In view of the overall consumption of water as visualized by the chart or graph, the user may reduce the time of the shower and/or replace shower heads to reduce water consumption.

The learning module 1008 may perform pattern matching to identify water consuming events. In various embodiments, the user may identify various appliances and fixtures using the preference module 1012. The learning module 1008 may then identify how much water those appliances and fixtures use over a predetermined period of time and characterize events that meet those expectations accordingly. For example, the user may identify a model of washing machine that uses X gallons of water over 25 minutes. When the learning module 1008 identifies that approximately X gallons of water over approximately 25 minutes have been used, the learning module 1008 may categorize the event as dishwashing. Those skilled in the art will appreciate that a user may overwrite the categories of the learning module 1008.

In some embodiments, the learning module 1008 uses a pattern matching algorithm based on a model of the daily human water usage. This model may take into account a number of parameters such as the location of the user, the time of the year, the number and age of the people sharing a water meter, the number and make of water appliances, number and make of toilets, and so on. In some embodiments, the more accurate these parameters, the more accurate the model and hence the more accurate the identification of the activities. This may be akin to supporting virtual meters. For instance, various water consuming activities may be identified (e.g., irrigation) and the cost of that activities without having to attach a separate water meter for the irrigation system.

The algorithm may include a process for scanning the data and looking for pulses (i.e., when the data spikes from zero to a non-zero value). The amplitude and the duration of the pulse may correspond to a given activity (e.g., flushing the toilet). Each activity may have a signature. For example, it may take approximately 20 seconds to fill up the tank of a low flow toilet (1.6 gallon per flush toilet). For this activity, a pulse with a given amplitude that has a duration of 20 seconds (see diagram below) may be detected. The tally of the pulses may denote the number of gallons that was used for the activity. In one example, 20 seconds×0.08 gallons per second which equals 1.6 gallons.

In some embodiments, pulse speed (or flow rate) and pulse duration may be used for classification. In one example, a binary or fixed flow rate (e.g., on-off function) uses may be distinguished from 'continuous' or variable rate uses. Fixed rate uses may include, for example, operating a toilet, dishwasher, washing machine, and irrigation. If the utility water pressure is approximately constant over time, then the flow rate for the fixed uses may be the same each time that the meter device 102 is used (but may differ by device, depending on floor i.e. height, pipe length, etc). The continuous uses may be user controllable valves on sinks and showers. These flow rates may vary over time depending on user selected flow rate and mixture of hot and cold water.

Figure 17:
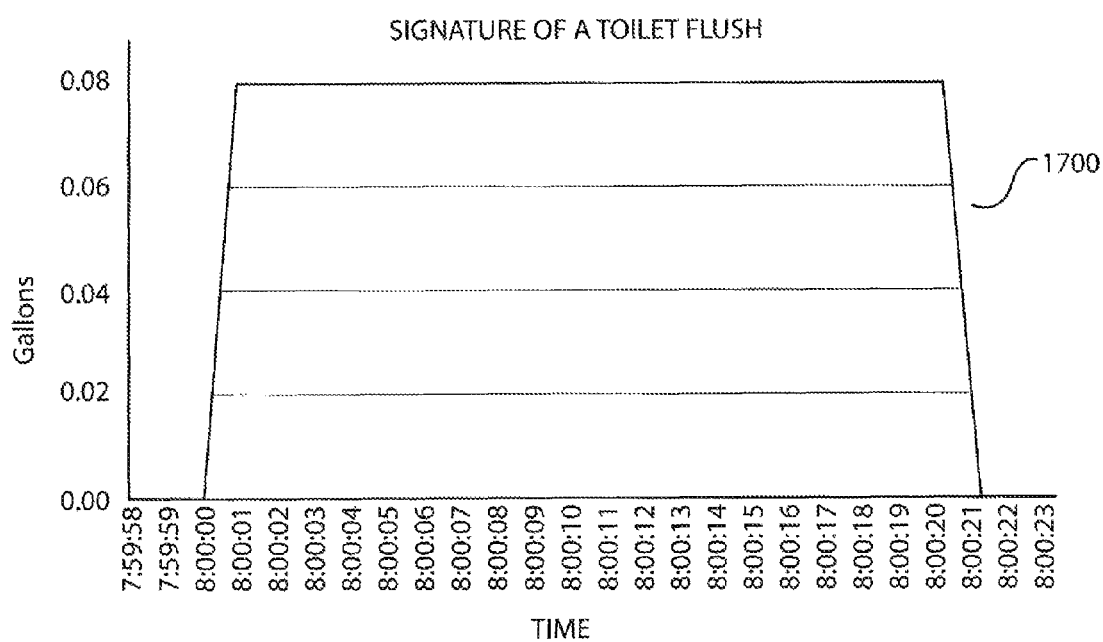
FIG. 17 is a graph depicting an exemplary signature for a specific household activity.

In this example, shown in graph 1700 of FIG. 17, each household activity has a range of possible signatures, which the pattern matching algorithm attempts to detect. The user may control parameters of this model by providing the value of some of the basic parameters. In one example, the user sets parameters (e.g., via the preference module 1012) such as the number and age of people in the household, number of bathrooms and toilets, make and brand of water appliances, and so on. Moreover, the user may update the identified activities that the system has identified and thus help improve the model for that given user. In some embodiments, the learning module 1008 may assign a confidence level to each activity that it identifies. The closer the given data matches a signature of a given activity, the higher may be the confidence level. In some embodiments, the user can review water usage information and identify patters of use and activities.

The learning module 1008 may also attempt to handle overlapping usage (e.g., person flushes the toilet and while the toilet tank is filling up, washes his hands for 30 seconds). The learning module 1008 may count the pulses to get the number of gallons used. If two or more activities fully overlap, then the learning module 1008 may assign an activity with a confidence level. In some embodiments, the learning module 1008 is configured to display the degree of confidence. If the pattern of the activity matches a known signature exactly, then the learning module 1008 is highly confident. Partial matches come with a reduced level of confidence. The learning module 1008 may keep its own derived activity and user supplied activity. Keeping both types of information may allow the system to identify the cases where the user purposely tries to fool the system.

Fixed used items may also have an identifying signature. The learning module 1008 may take the water pressure into account when matching fixed usage against known signatures. Water pressure may affect the frequency of the pulses but not the amplitude of the gallons graph. For example, a dishwasher running late at night versus in the middle of the working day may have different level of water pressure (high at night and lower in the middle of the day), so the learning module 1114 may take into account the impact of the water pressure when the learning module 1114 tries to find a signature to match a fixed use activity.

The user can review the result of the learning module 1008 and help improve the reliability of detection. In some embodiments, the customer may enter preferences (e.g., via the preference module 1012) to provide details of the individual and make of the appliances, the number and age of people in the household, and so on. In addition, the user can assign activities to the water usage graphs.

Figure 18:
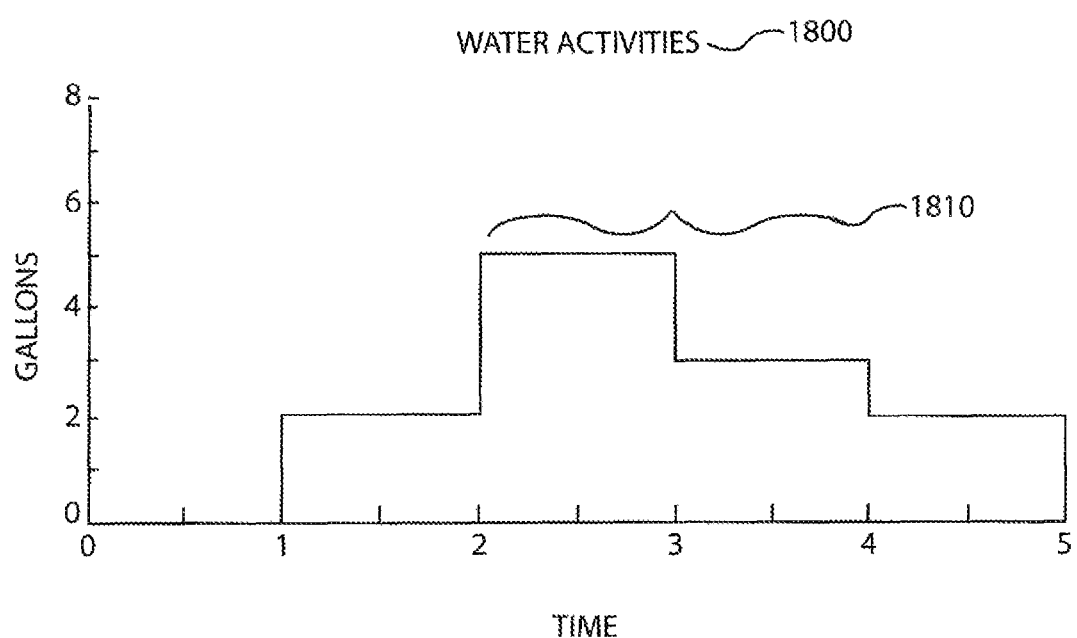
FIG. 18 is a visualization depicting usage based on activity in an interactive display.

In one example, shown in FIG. 18, the visualization module 1006 may display the following visualization 1800 to the user. The user may display and interact with the graph by following the instructions to drag the mouse over the usage graph and select an activity 1810 and/or add a comment. In some embodiments, a characterization may already be chosen. The user may change the category if the learning module 1008 is incorrect.

The suggestion engine 1010 may be configured to provide the user with suggestions for conservation. In some embodiments, the suggestion engine 1010 receives derived and assigned activities information from the visualization module 1006, the learning module 1008 and/or the preference module 1012. This suggestion engine 1010 may compute a projected monthly and annual cost of each activity thereby allowing a user to be aware of the financial impact of this activity. The suggestion engine 1010 may also suggest ways for the user to minimize this cost. In one example, the visualization module 1006 may generate a pie chart of water consumption activities. The use may be able to interact by clicking on activities of the pie chart to invoke the suggestion engine 1010. The suggestion engine 1010 may walk the user through available options for reducing cost. In one example, the suggestion engine 1116 may suggest take advantage of local government or manufacturers rebates to replace existing and less efficient appliances with more water efficient appliances.

In various embodiments, local municipalities, state and city governments, utilities, plumbing companies, and appliance manufacturers may offer rebates, discounts, to breaks, or other incentives to purchase and/or replace existing infrastructure. The suggestion engine 1010 may alert the user to those benefits that may be available based on information provided by the user in the preference module 1012 (e.g., appliances used, number of people, type of business or household, location of facility, and/or the like).

The preference module 1012 may be configured to allow the user to input information regarding water usage activities and the facility related to the water usage (e.g., residential, business, agriculture, and the like).

In some embodiments, the user may also set alerts in the preference module 1012 that may trigger an alert when preconditions or thresholds are met. For example, water is consumed consistently over a 24 hour period, a leak may have occurred and the user may set a preference to be notified as well as the method of notification (e.g. email address, voice mail, or SMS message).

The alert module 1014 is configured to alert the user. The alert module 1014 may alert the user, utility, and proper authorities if a pipe break is detected (e.g., a high volume of water is being consumed that is not typical or over a long period of time). The alert module 1014 may be configured by the preference module 1012. Further, the alert module 1014 may provide an alert when certain conditions are met regardless of the preference setting.

In some embodiments, the meter data module 1004 may be configured to detect water leaks by detecting a constant flow of water over a 24 hour period. Once a threshold is met, the meter data module 1004 may cause the alert 1014 to notify and/or alert the user if it detects leaks or other abnormally high water usage or when the user crosses certain other conditions. The way the user is notified and/or alerted may be controlled by user preferences. In one example, the user may configure the preference module 1012 to alert the user when there has been constant water usage for more than two hours. The user may also configure the preference module 1012 to alert the user in any number of ways (e.g., voice mail, e-mail, SMS message or the like).

The competition module 1016 may be configured to provide opportunities for the user to compete with themselves, other specific individuals, or general consumption of a region, neighborhood, or community (for example).

To encourage friendly competition between friends and communities, users may opt-in to share their water usage amongst themselves. The GUI module 1002 may display information pertinent to the competition, like goals, objectives, a duration of time, prizes, etc. The competition module 1110 may also allow a user to keep abreast of how their water conservation efforts fares in comparison with their friends and neighbors. In some embodiments, the competition module 1110 may allow developers to create widgets for social networks like Facebook that display water usage between two or more customers or groups of customers.

The competition module 1016 may also allow the user to simply compare their water usage as well as the consumption of specific activities to the average consumption of a region. For example the user may compare usage with the average consumption of a neighborhood by zip code, a state, or any geographic regions.

In some embodiments, the competition module 1016 may calculate an score for a user to allow for a quantifiable number of competition. Any number of variables may be taken into account to compute the score for a given user. These may include:
  1. The daily and monthly level of water used per person in the given household.

2. The number of gallons of water conserved per month.
3. The amount of water used for irrigation
4. The amount of water used as compared to national and regional averages.
5. The direct water footprint
6. The water offset—the residual water that remains, after the user reduces his water usage. This residual water footprint can be offset by supporting other conservation or water quality activities e.g., (charitable donations).

In some embodiments, external data sources may be used to confirm or validate information if the score appears unreasonable. In one example, census data may be reviewed if the data provided by the user appears to be unreasonable. For instance, a user may declare that there are 20 people in the household as a way to reduce their average water per person used to increase their score. A user that manages to maintain a low usage will be awarded with a high score. In some embodiments, once the user manages to reduce their usage to a minimum (lower than national average), the user may receive a high score.

In various embodiments, the user may control water activity with the meter control module 1018. For example, user may use a digital device such as a computer or smart phone to contact the meter control module 1018 to mark the start and stop of a water activity. The customer server 110 may start or stop the water and/or meter device 102. In one example, the user can use a mobile device to define the time boundaries of activities and thus improve the activity detection component of the earning system. In some embodiments, the user cannot interact with the meter device 102.

The web page may also allow users to donate to charitable organizations. In one example, a portal is available on the web page that displays or links to a website or variety of websites to water-related charitable organizations. In some embodiments, individual users/households can donate a portion of money saved on their monthly water bill to a charitable organization. For instance, if a household saves $5.00 on their monthly water bill, the user may access the portal and donate $1.00 of those savings, therefore saving $4 and giving $1 to a clean water charitable organization. In some embodiments, customers can view their own cumulative donations as well as cumulative donations made by other utility customers (either individually, as a group, and/or anonymized) on the web page.

In some embodiments, the customer server 110 allows the water usage data to be available for research and mash-ups. In various embodiments, identifying information about a user in the water usage data may be removed from the shared usage information. In one example, the name and the location of the user may remain private and cannot be searched (e.g., anonymous aggregate data will be made available). For example, a user may compare water usage to a collection of homes in their neighborhood but not to a specific house.

In some embodiments, the customer server 110 may provide web services w to allow researchers and developers to query usage information based zip codes, counties, and states. In one example, researchers may query for the estimated amount of water irrigation used in a given zip code. These web services may allow for integration with third-party systems such as Google Power Meters or various home automation systems.

Figure 11:
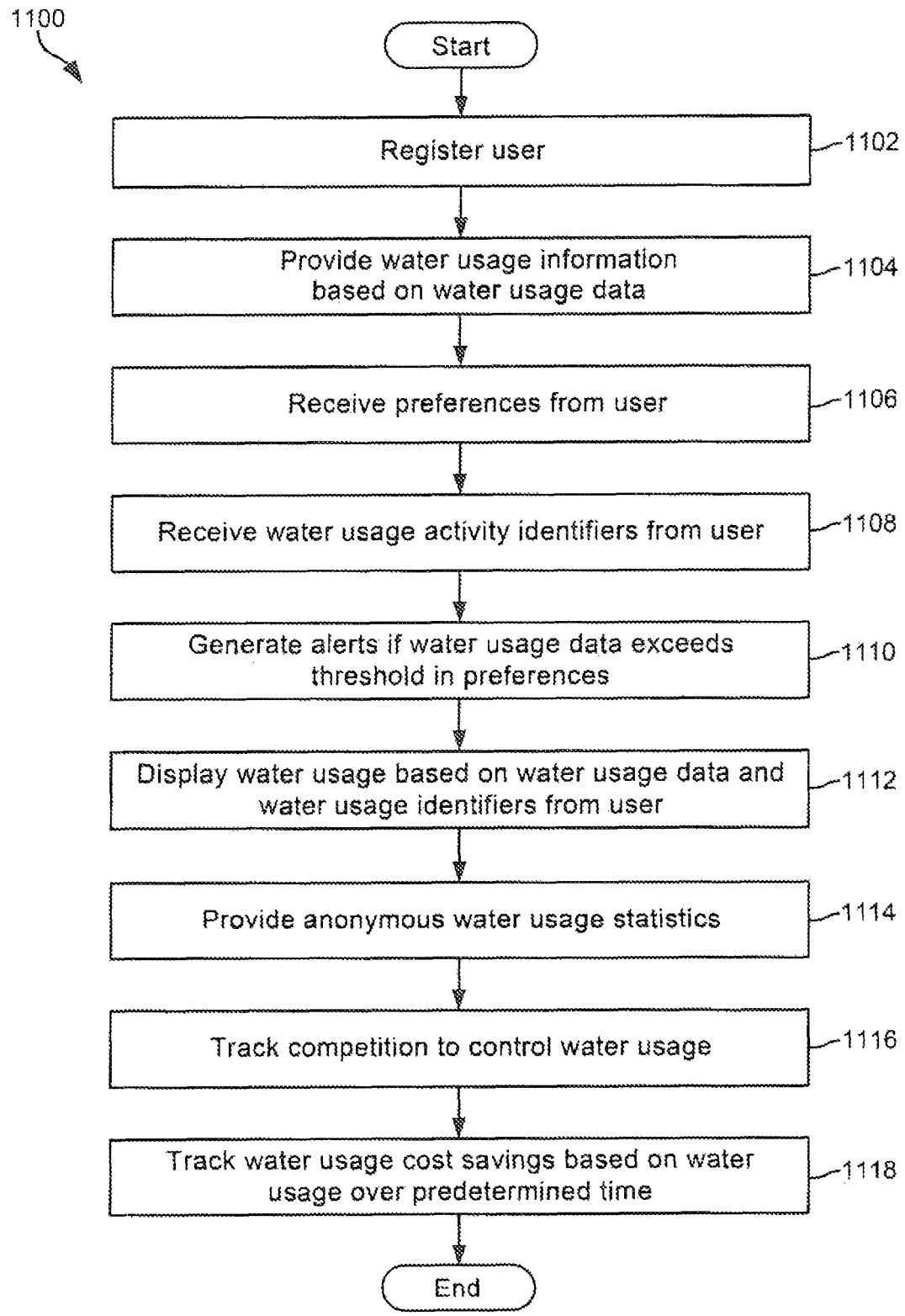
FIG. 11 is a flowchart for interacting with water usage data.

FIG. 11 is a flowchart for interacting with water usage data. In step 1102, the GUI module 1002 registers a user. In one example, a user browses to a web page hosted by the customer server 110. The user may then choose to register by providing an identifier such as a username and a password.

In some embodiments, the user may be required to enter an identifier that identifies the water meter or a water device 102. The user may also be required to provide a utility account number to further authenticate the user.

The GUI module 1002 may then authenticate and/or verify the user. In some embodiments, the GUI module 1002 verifies the water meter identifier, information about the user (e.g., address), and/or account number through a utility (e.g., via the data management server 108).

The GUI module 1002 may create a secure connection with the server during registration and during access water usage information. In one example, the GUI module 1002 may establish a secure connection (e.g., https), apply certificates, and/or use encrypted keys to secure the session.

In step 1104, once the user is registered, the user may receive access to their water usage information on a web page. In some embodiments, the GUI module 1002 displays a "dashboard" the indicates water consumption at the user's house, business, farm, etc. In some embodiments, the user may have access to water usage information that came from one or more water meters and/or meter devices 102. The visualization module 1006 may provide visualizations of water usage data and the learning module 1008 may identify any water consumption events that match patterns.

In step 1106, the user may enter preferences including information about a home or business (e.g. number of people living at the home or business, type of business, water requirements, types of appliance, and the like). The user may also identify one or more water usage events and associate the events with categories (e.g., shower, bath, laundry, front yard irrigation, back yard irrigation and the like) in step 1108.

The preference module 1012 may also receive preferences from a user which indicate when and how an alarm may be received. For example, the user may indicate that when overall water consumption rises above a threshold or if the water consumption for one or more activities rises about the threshold, the user is to be alerted. The user may indicate that the user is to receive an SMS message. The alert module 1014 may alert the user with an SMS message when the threshold is exceeded in step 1110. At which point, the user may access the web page to view the most available water usage information to identify potential problems.

In step 1112, the GUI module 1002 may display water usage based on water usage data and characterizations from the user. In one example, the visualization module 1006 may generate a pie chart that indicates the different water activities, based on characterizations and/or categories identified by the user in user preferences and/or the learning module 1008. The user may click on slices of the pie chart to further define or identify water consumption activities. As the user understands the effect and amount of water some activities or events consume, the user may then make choices to curtail or eliminate those activities or events.

In step 1114, the competition module 1016 may provide anonymous water usage statistics. For example, the competition module 1016 may provide the user the mean and median water usage consumption of individuals that are similarly situation (e.g., with a similar sized family and house). The competition module 1016 may also provide water usage statistics of similar neighborhoods and/or businesses. The user may then see if their water costs and/or usage is higher or lower than normal.

In step 1116, the competition module 1016 may track competition to control water usage. In some embodiments, the user may compete with themselves, another individual, or a group to lower their water consumption or overall water footprint. The user may enter the parameters of the competition with the competition module 1016 (e.g., who is competing, the duration of the competition, goals of the competition, and the like). The competition module 1016 may then track the consumption of one or more of the competing parties and display results throughout the competition. The competition module 1016 may also be configured to provide, notice to the winner as well as notify social networks of water conservation success.

In step 1118, the GUI module 1006 may track water usage cost savings based on water usage over a predetermined time. In some embodiments, the GUI module 1006 communicates with the data management server 108 to determine the costs associated with water consumption for the user. In other embodiments, the GUI module 1006 may receive that information directly from the user. The GUI module 1006 may continue to track the water usage of the customer and provide visualization and notices of changes in water consumption behavior.

Figure 12:
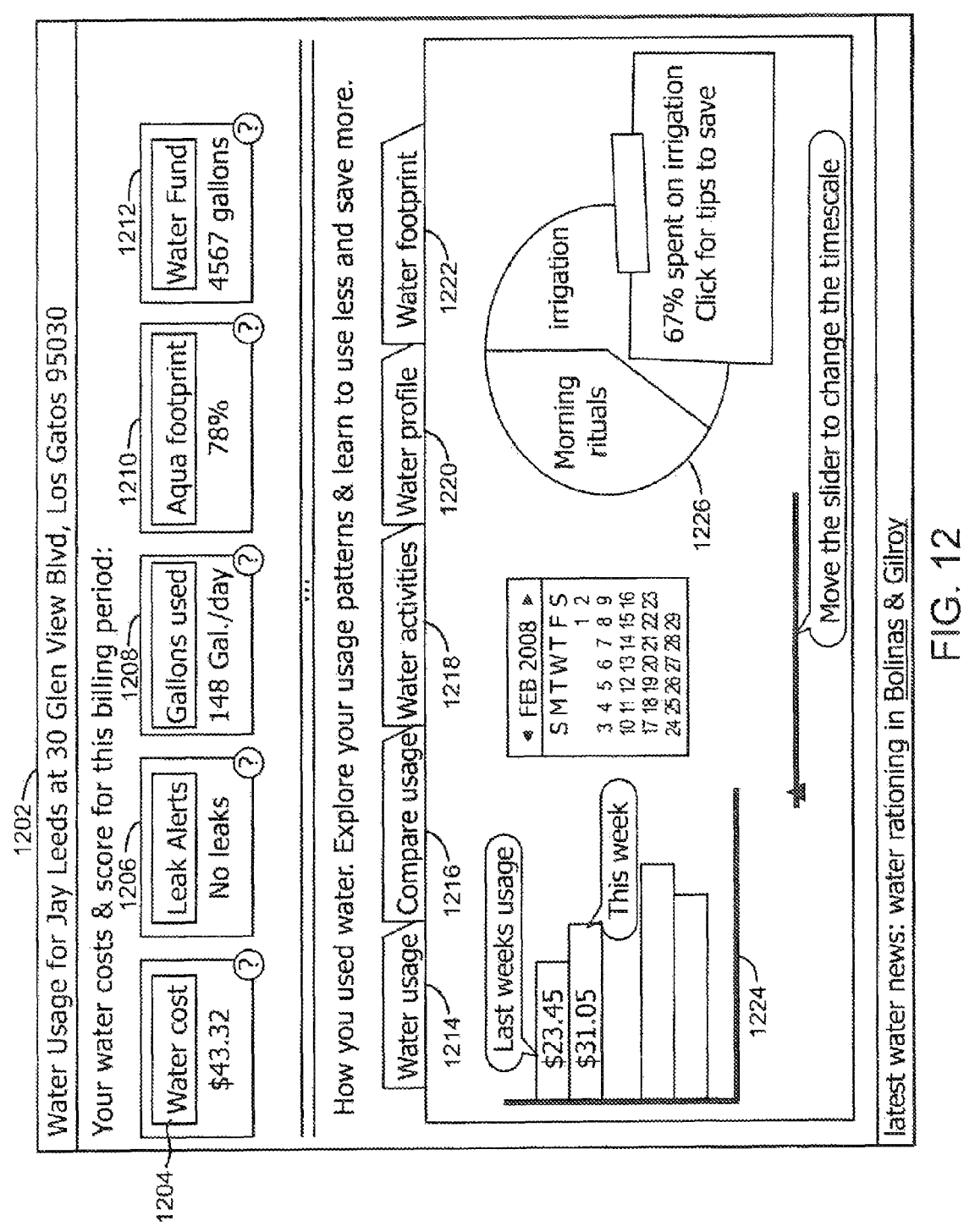

FIG. 12 is an exemplary screenshot of a graphical user interface 1202 allowing a customer to interact with water usage information in some embodiments.

In various embodiments, the GUI module 1002 may display an intuitive web-based interface. The interface may be described as a "dashboard." In some embodiments, the web-based interface may:
1, calculate water conservation
2. compare water usage & setup conservation competitions
3. aggregate water meters to track and compare as a group
4. analyze water usage
5. track and administer water meters
6. detect leaks & provides leak alerts
7. generate alerts when user or predefined system parameters are exceeded Access to the usage information may be provided to the users via a network such as the Internet. In some embodiments, the consumer may access a water usage dashboard which provides data and information to enable the user to make informed decisions on their use of water and take all the steps necessary to save water and reduce their water bill. Alerts such as leaks, or over usage may be automatically sent to users based on their communication preferences (e.g., SMS, e-mail, or voice-mail).

The graphical user interface 1202 may comprise a water cost display 1204, a leak alert display 1206, a gallons used display 1208, an aqua footprint display 1210, a water fund display 1212, a water usage tab 1214, a compare usage tab 1216, a water activities tab 1218, a water profile tab 1220, a water footprint tab 1222, a bar graph 1224, and a pie graph 1226.

The cost display 1204 may display water cost for a predetermined period such as a billing period. In some embodiments, the GUI module 1002 retrieves the cost of water from a utility that provides billing for water consumption. In other embodiments, the user may enter the cost of water manually (e.g., via the preference module 1012).

The leak alert display 1206 may indicating if a leak is detected. In some embodiments, the meter data module 1004 may monitor water usage data to determine if there is a constant use of water over a predetermined period of time which may indicate a leak. If no leak is found, the leak alert display 1206 may display a message indicating that there are no leaks. The message may be color coded (e.g., green for no leaks found and red for leaks found). If a leak is found, the leak alert display 1206 may display a message indicating that there may be one or more possible leaks. In some embodiments, the alert module 1014 may provide an alert to the user if a leak is detected.

The gallons used display 1208 may display the water consumed over a predetermined period of time. For example, the gallons used display 1208 may show an average water usage per month, per week, per day, or per hour. In some embodiments, the user may configure the time period to indicate the time period of gallons used. Further, the user may configure the quantity of water to be any units including liters. In some embodiments, the user may apply statistical measures to determine, for example, the median water usage over a predetermined time. Any statistical measures may be used over any period of time.

The aqua footprint 1210 may be the water footprint of an individual which may be defined as the total amount of water that is used to produce goods and services consumed by the individual or community or produced by the business.

The water fund display 1212 may display an amount of water that has been conserved or reduced over time. In one example, the customer server 110 may determine average water use over a year, season, or other period of time. The user may configure the customer server 110 to track water consumption and reduction. The user may also configure the customer server 110 to add the number of gallons (or any volume metric) "saved" (e.g., less water consumed when compared to the average or other statistical measure). The water fund display 1212 may show the amount of water that is conserved or saved through the user's conservation efforts. In some embodiments, the user may configure the customer server 110 to determine the cost of the water displayed in the water fund display 1212. An amount of money equivalent to the cost may be donated to charity in various embodiments.

The graphical user interface 1202 may also comprise tabs that the user may click on to access different information. If the user clicks on the water usage tab 1214, the user may view one or more visualization of water consumption based at least in part on water usage data from the water meter and/or the meter device 102.

In some embodiments, the visualization module 1006 may display the bar graph 1224 and/or the pie graph 1226. The bar graph 1224 compares the cost of water usage of the current week to the cost of water usage from the previous week. As discussed herein, the user can configure the visualization module 1006 to display water usage (e.g., in quantifiable metrics), costs, statistical measurements, comparisons, and/or water usage identifiers. In this example, the bar graph 1224 compares the cost of water consumed from one week to another. The user may also be able to change the colors of the bar graph 1224.

The pie graph 1226 may show the total water consumed over a predetermined time and display the activities or events associated with water consumption. In FIG. 12, the pie graph 1226 indicates that most of the water used is for irrigation while the rest is used in "morning rituals." The user may device any activity or groups of activities. In some embodiments, the user could click on morning rituals and further break down water usage activities and events to identify dishwashing, clothes washing, showers, and the like. The user may display any kind of graph based on the desired identifier and/or groupings.

In various embodiments, the customer server 110 may display a slider to automatically change the timescale of the charts (e.g., bar graph 1224 and pie graph 1226) as well as the time scale for the gallons used display 1208.

In various embodiments, the suggestion engine 1010 may offer the user suggestions to save water based on the water usage information and graphs. For example, the user may click on a link or a part of the graph to see a suggestion. In one example, the user may click on irrigation and receive a suggestion that irrigation may be performed at night to reduce evaporation and allow plants the ability to absorb greater amounts of water.

The compare usage tab 1216 may allow the user to view competitions with themselves, other individuals, or groups. The competition module 1016 may track the competition and display the winning party. The competition module 1016 may also display the amount of water that may need to be conserved to compete.

The water activities tab 1218 may allow users to identify water usage events or activities as identifiers and/or categories. In various embodiments, the preference module may receive the user's identifiers and categorizations as well as patterns of water usage that suggest or indicate that an event has been identified. In one example, the user may typically take a shower at a set duration at a typical time of day. The user may identify the water usage event by clicking on the water activities tab 1218. The learning module 1008 may then recognize the amount of water usage, at a given time, for a given duration, as a shower and characterize the water activity as such.

The water profile tab 1220 allows the user to establish a water profile. The water profile may include factors that relate to water consumption including type of pipes, types of fixtures, types of appliance, number of people at the facility, type of business, irrigation needs and so on.

The water footprint tab 1222 may allow the user to change one or more preferences that relate to the aqua footprint.

Figure 13:
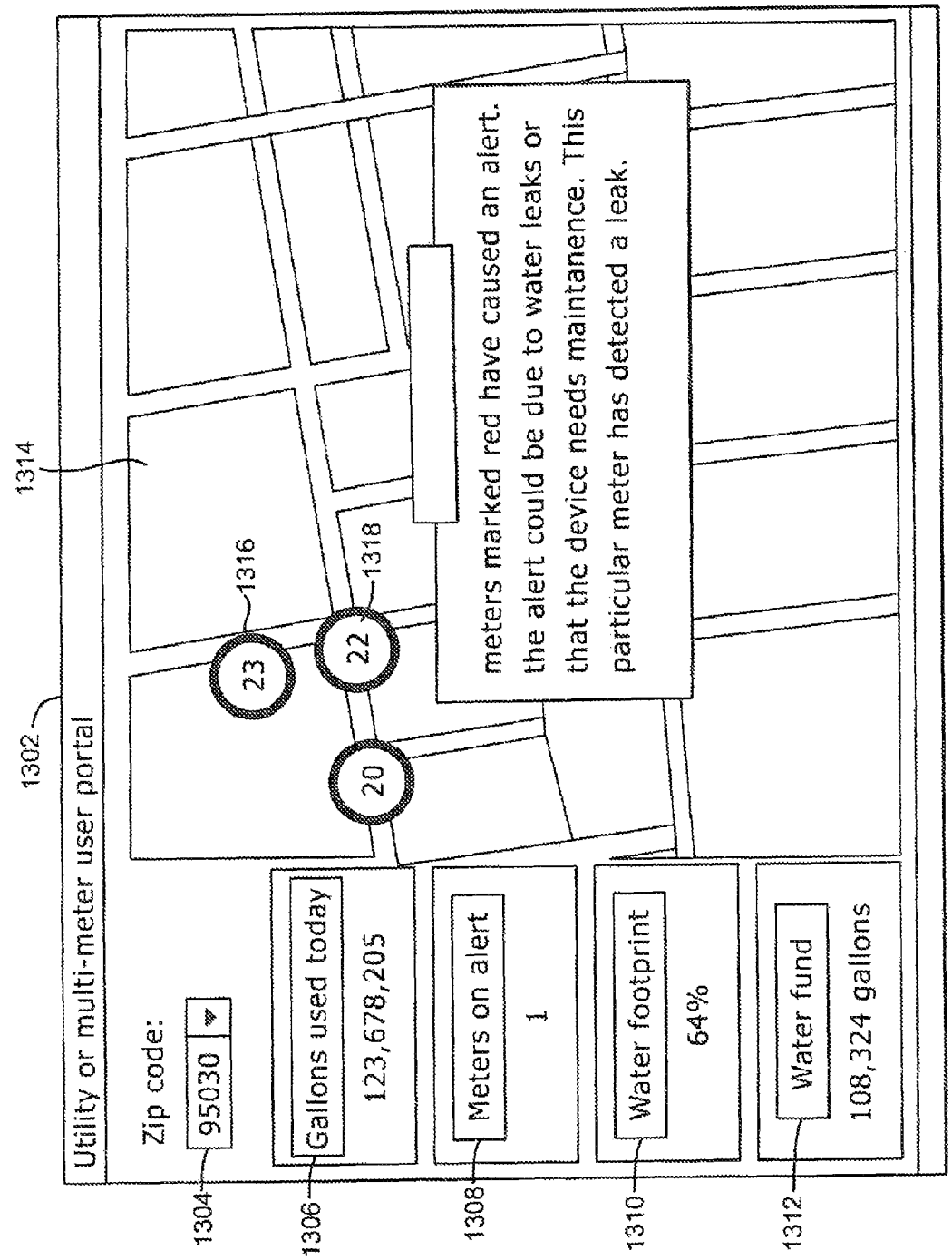
FIG. 13 is an exemplary screenshot of a graphical user interface for multi-meter information.

FIG. 13 is an exemplary screenshot of a graphical user interface 1302 for multi-meter information. In some embodiments, the customer server 110 can be used with existing data collection and automation infrastructure Utilities or consumers with multiple meters may have a dashboard or other graphical user interface that gives them access to a set of meters plus the detailed usage view for each meter.

In some embodiments, the customer server 110 may allow commercial consumers to sub-meter with automatic water usage data collection to identify water usage at different locations of a business. The customer server 110 may display online tacking of water usage data for all sub-meters and be alerted for water leaks and/or over usage. Businesses may also conduct historical comparisons and track usage.

The graphical user interface 1302 may be used by a business with multiple water meters and/or meter devices 102. The graphical user interface 1302 may comprise a zip code field 1304, a gallons used today display 1306, a meters on alert display 1308, a water footprint display 1310, a water fund display 1312, a map 1314, and meter markers 1316 and 1318 on the map 1314.

Those skilled in the art will appreciate that the gallons used today display 1306, the water footprint display 1310, and the water fund 1312 may be associated with any number of meters. In one example, the gallons used today display 1306 may display gallons used at a specific meter (e.g., meter device associated with meter marker 1316) or a plurality of meter devices (e.g., meter devices associated with meter marker 1316 and 1318 but not any other on the map 1314). In various embodiments, the user may configure the graphical user interface 1302 to include any number of meters, change the period of time (e.g., hours, days, weeks, months, years, or the like), the metric of water measurement (e.g., liters), at any time.

In some embodiments, the user may enter a zip code in the zip code field 1304 to view the status of one or more meter devices 102. The meter devices 102 may appear as markers on a map 1314 associated with the zip code. In other embodiments, the user may enter a region, city, town, or combination of geographic addresses/locations to view markers associated with meter devices 102.

The gallons used today display 1306 may display the amount of water used associated with any number of water meters. In this example, the gallons used today display 1306 may indicate that amount of water consumed at three different physical addresses.

The meter on alert display 1308 may indicate a number of meter devices 102 that are currently on alert. A meter device 102 may be found to be on alert when the meter device 102 is reporting an error, has been tampered with, batteries are low, AC power is loss, capacitors need to be replaced or the like. Further a meter device 102 may be found to be on alert if a leak is detected. In some embodiments, leaks may be found even if they only leak a couple of ounces. In this example, meter marker 1318 indicates that a water meter is on alert.

The water footprint display 1310 displays the water footprint of those facilities that may be located on the map 1314. In some embodiments, the water footprint display 1310 displays the water footprint of the entire business.

The water fund display 1312 may display the water fund if the business owner or user has chosen to use the water fund as a metric of water savings and/or chosen to provide for charitable organizations based on water conservation. In some embodiments, the water fund represents costs saving of an entire business or one or more water meters.

The GUI module 1002 may also visually depict alerts by color. In some embodiments, the GUI module 1002 may display the meter markers in colors (e.g., red for alert and green for not alert). The user may be able to click on a meter marker to view the condition of the alert. In one example, when the user clicks on the red meter marker 1318, information may be displayed including where the marker is, identifying information, and/or the state of the alert (e.g., battery needs to be replaced or communication with a meter device 102 is suddenly limited). The alert information may be forwarded as a message (e.g., email, SMS, voice mail or the like) to responders to correct the problem.

The above-described functions and components can be comprised of instructions that are stored on a storage medium (e.g., a computer readable storage medium). The instructions can be retrieved and executed by a processor. Some examples of instructions are software, program code, and firmware. Some examples of storage medium are memory devices, tape, disks, integrated circuits, and servers. The instructions are operational when executed by the processor to direct the processor to operate in accord with embodiments of the present invention. Those skilled in the art are familiar with instructions, processor(s), and storage medium.

The present invention has been described above with reference to exemplary embodiments. It will be apparent to those skilled in the art that various modifications may be made and other embodiments can be used without departing from the broader scope of the invention. Therefore, these and other variations upon the exemplary embodiments are intended to be covered by the present invention.

We claim:

1. A method comprising:
receiving water usage data from a meter device;
receiving an identifier from a user associated with the meter device;
providing an interactive interface to the user, the interactive interface conveying at least some water usage information based on the water usage data;
receiving a first characterization of a first water activity, associated with a period of time that is less than a total time associated with the water usage information, in the water usage information from the user, the first characterization including a user designation provided through the interactive interface describing the water activity;
generating a visualization based on the water usage information and the first characterization of the first water activity; and
displaying the visualization.

2. The method of claim 1, further comprising characterizing a second water activity based on pattern matching.

3. The method of claim 2, wherein pattern matching comprises matching a duration of water consumption and a quantity of water consumed with a second characterization.

4. The method of claim 3, wherein the visualization is further based also on the second characterization.

5. The method of claim 1, wherein the meter device is a water meter.

6. The method of claim 1, wherein the meter device is coupled to a water meter.

7. The method of claim 1, further comprising receiving user preferences to set an alert threshold.

8. The method of claim 7, further comprising alerting the user when the alert threshold is exceeded.

9. The method of claim 1, further comprising detecting one or more leaks and notifying the user of the one of more leaks.

10. The method of claim 1, further comprising displaying suggestions to conserve water based on the water usage information.

11. A system comprising:
a meter data module configured to receive water usage data from a meter device;
a GUI module configured to receive an identifier from a user associate with the meter device and provide an interactive interface to the user, the interactive interface conveying at least some water usage information based on water usage data;
a preference module configured to receive a first characterization of a first water activity, associated with a period of time that is less than a total time associated with the water usage information, in the water usage information from the user, the first characterization including a user designation provided through the interactive interface describing the water activity; and
a visualization module configured to generate a visualization based on the water usage information and the first characterization of the first water activity and display the visualization.

12. The system of claim 11, further comprising a learning module configured to characterize a second water activity based on pattern matching.

13. The system of claim 12, wherein pattern matching comprises matching a duration of water consumption and a quantity of water consumed with a second characterization.

14. The system of claim 13, wherein the visualization is further based also on the second characterization.

15. The system of claim 11, wherein the meter device is a water meter.

16. The system of claim 11, wherein the meter device is coupled to a water meter.

17. The system of claim 11, wherein the preference module is further configured to receive user preferences to set an alert threshold.

18. The system of claim 17, further comprising an alert module configured to alert the user when the alert threshold is exceeded.

19. The system of claim 11, wherein the meter data module is further configured to detect one or more leaks and the system further comprises an alert module configure to notify the user of the one of more leaks.

20. The system of claim 11, further comprising a suggestion module configured to generate suggestions to conserve water based on water usage information.

21. A non-transient computer readable medium comprising instructions, the instructions being executable by a processor to perform a method, the method comprising:
receiving water usage data from a meter device;
receiving an identifier from a user associated with the meter device;
providing an interactive interface to the user, the interactive interface conveying at least some water usage information based on the water usage data;
receiving a first characterization of a first water activity, associated with a period of time that is less than a total time associated with the water usage information, in the water usage information from the user, the first characterization including a user designation provided through the interactive interface describing the water activity;
generating a visualization based on the water usage information and the first characterization of the first water activity; and
displaying the visualization.

* * * * *